United States Patent
Mohri et al.

[11] Patent Number: 6,108,646
[45] Date of Patent: Aug. 22, 2000

[54] DATABASE MECHANISM, MEDIATING METHOD IN DATABASE SYSTEM AND PROGRAM STORING MEDIUM FOR IMPLEMENTING DATABASE SYSTEM

[75] Inventors: Takao Mohri; Yuji Takada; Hiroyuki Fujii, all of Kawasaki; Keizo Tabuchi, Okayama; Shinya Kouno, Kawasaki, all of Japan

[73] Assignee: Fujitsu Limited, Kawasaki, Japan

[21] Appl. No.: 08/990,750

[22] Filed: Dec. 15, 1997

[30] Foreign Application Priority Data

May 27, 1997 [JP] Japan .................................. 9-136222

[51] Int. Cl.⁷ ..................................................... G06F 17/30
[52] U.S. Cl. .................................................. 707/1; 707/10
[58] Field of Search .................................. 707/1, 10, 6, 3; 395/675; 455/453

[56] References Cited

U.S. PATENT DOCUMENTS 5,706,516  1/1998  Chang et al. ............................ 395/680
5,752,246  5/1998  Rogers et al. ............................ 707/10
5,761,663  6/1998  Lagarde et al. .......................... 707/10

*Primary Examiner*—Paul R. Lintz
*Assistant Examiner*—Sanjiv Shah
*Attorney, Agent, or Firm*—Staas & Halsey, LLP

[57] ABSTRACT

A facilitation mechanism between users and databases is composed of a user agent for interfacing between users and the entire facilitation mechanism, a DB agent for interfacing between each database and the facilitation mechanism, and a facilitation agent for mediating between each of the agents, which are distributed. By adopting this system in the present invention, a facilitation mechanism in which scalability can be secured for an increase in the number of users, the addition of databases, etc., operation load and operation managing cost can be distributed, and security of information can be protected, can be realized.

21 Claims, 31 Drawing Sheets

21~23: USERS
31~34: USER AGENTS
41~48: FACILITATION AGENTS
51~54: DATABASE(DB) AGENTS
61~64: DATABASES(DB)

21~23: USERS
31~34: USER AGENTS
41~48: FACILITATION AGENTS
51~54: DATABASE (DB) AGENTS
61~64: DATABASES (DB)

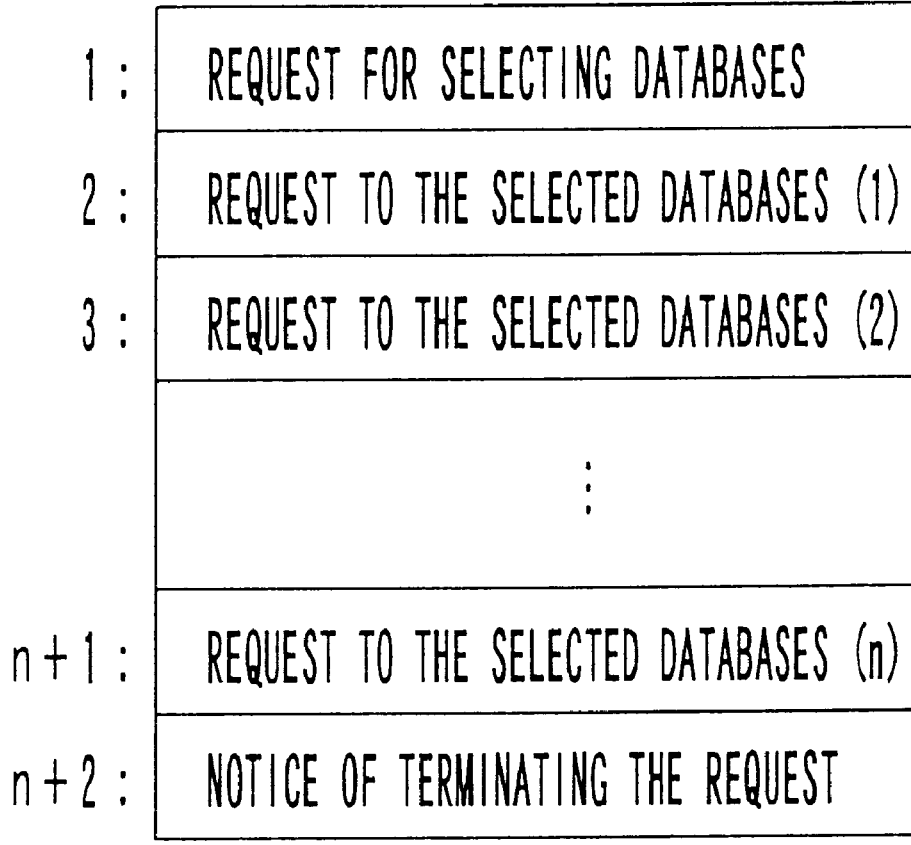
F I G. 6

| CONDITIONS | DESTINATION OF OUTPUT |
|---|---|
| CONDITION 11, CONDITION 12, $\cdots$, CONDITION $1n_1$ | AGENT 1 |
| CONDITION 21, CONDITION 22, $\cdots$, CONDITION $2n_2$ | AGENT 2 |
| $\vdots$ | |
| CONDITION m1, CONDITION m2, $\cdots$, CONDITION $mn_m$ | AGENT m |

F I G. 7

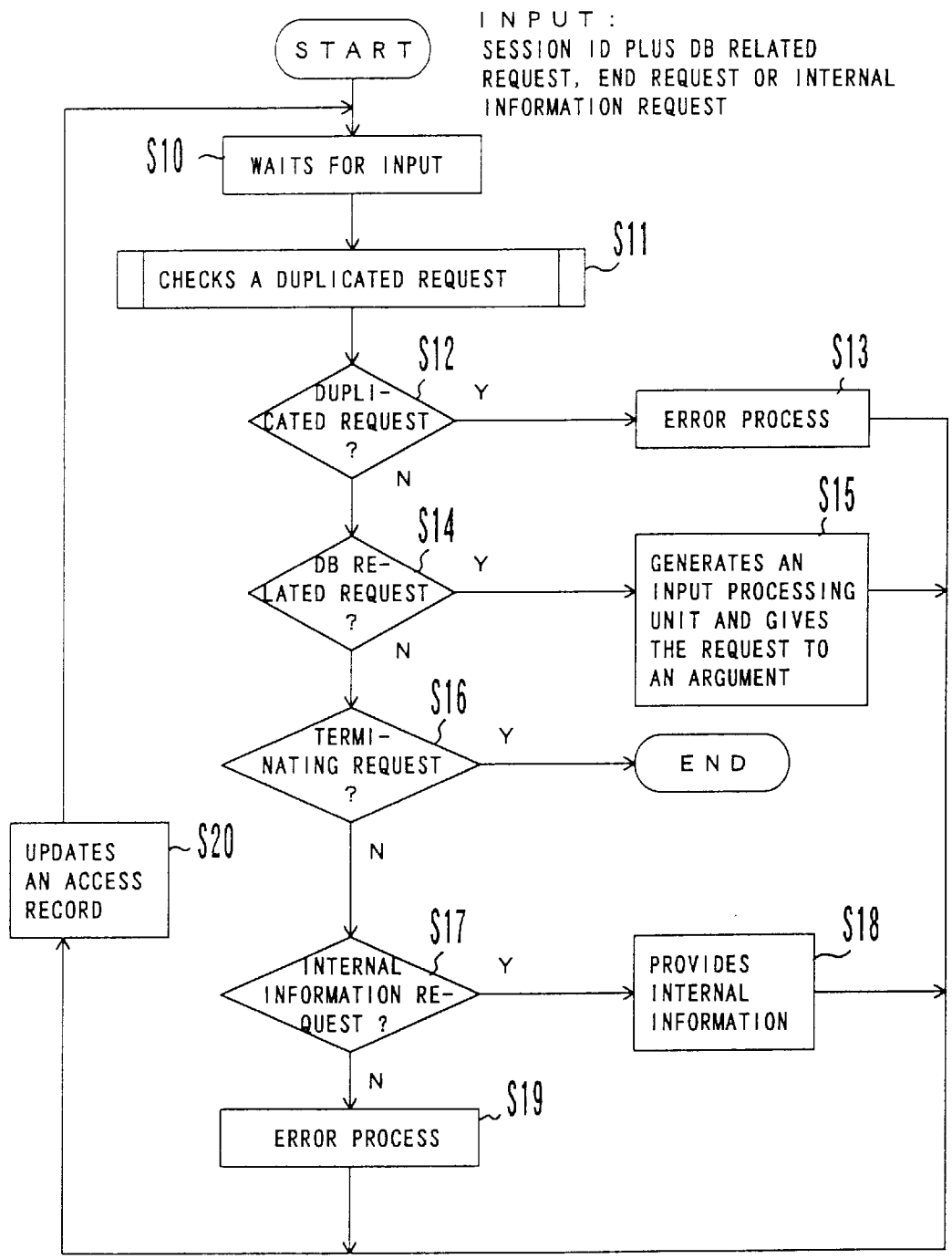
F I G. 1 3

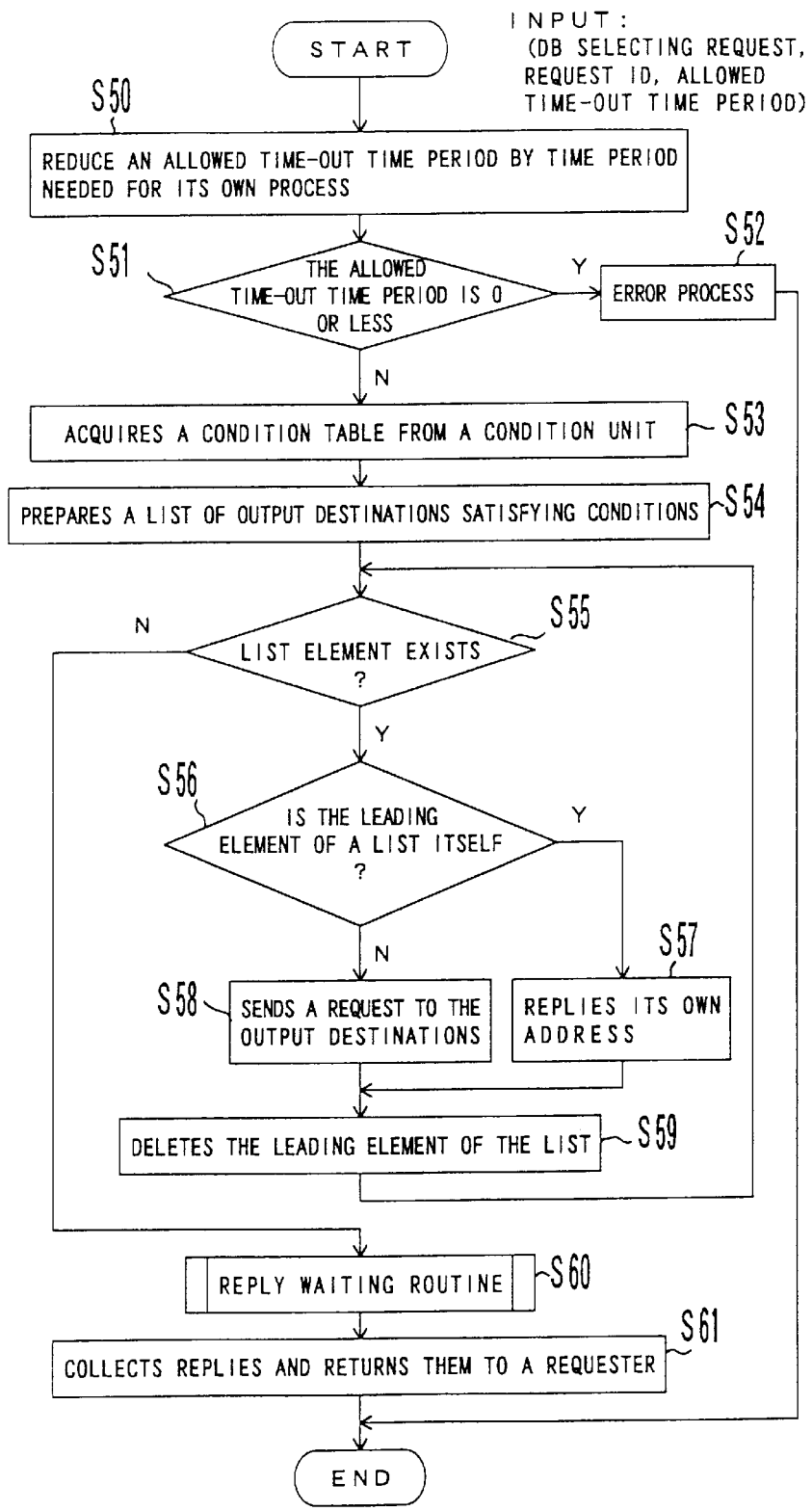
F I G. 17

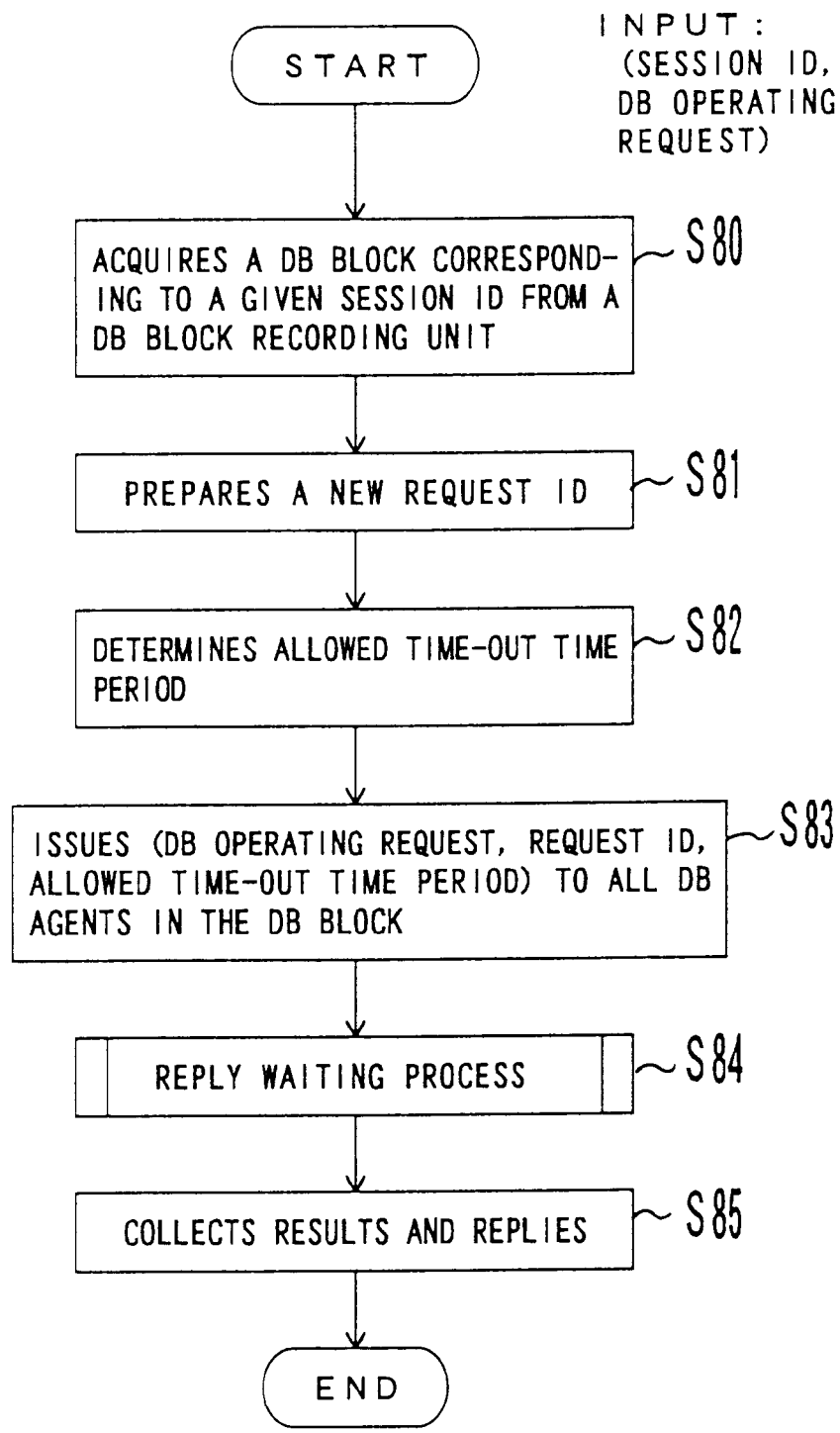
F I G. 1 9

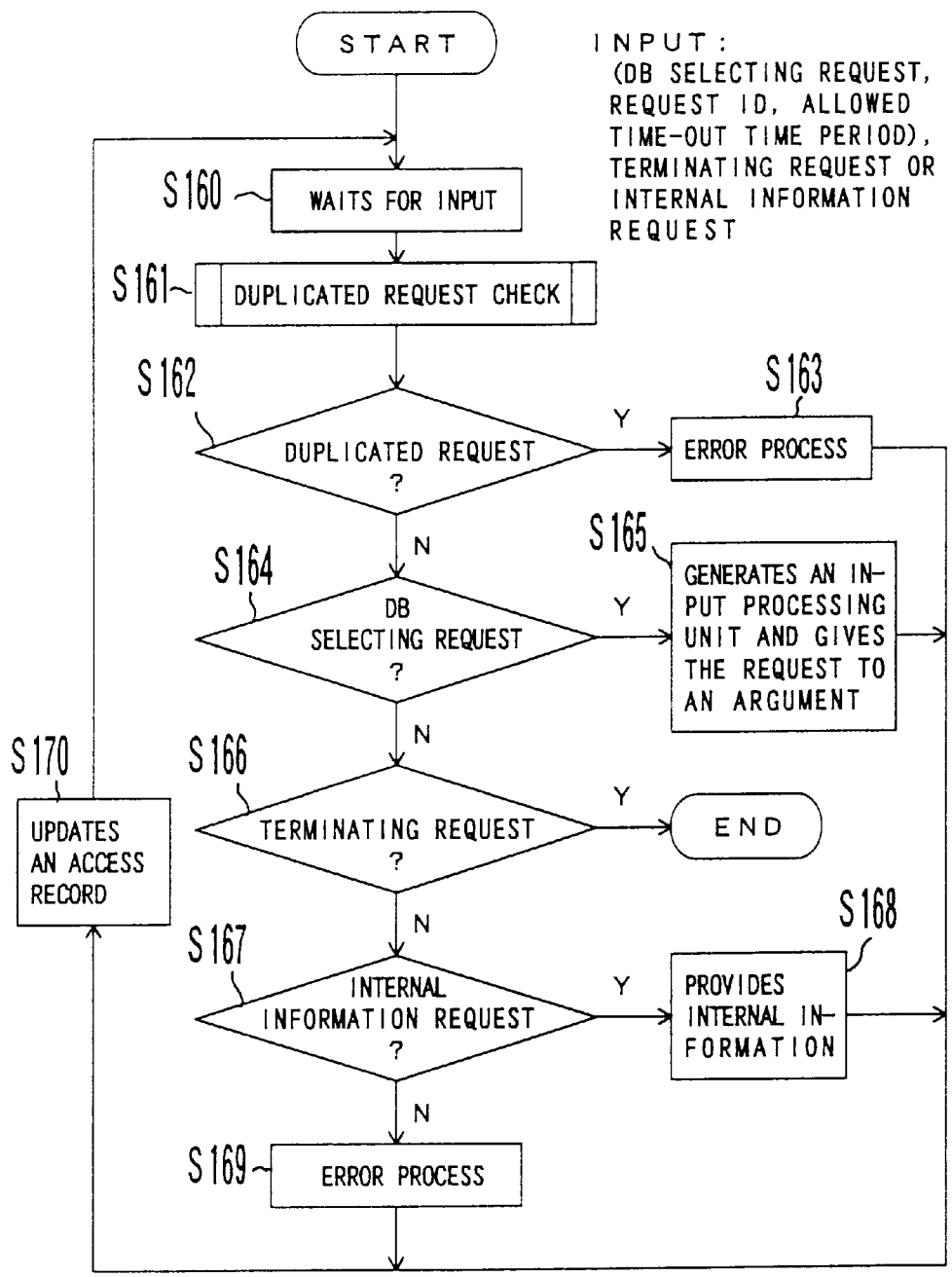
F I G. 2 3

| CONDITIONS | DESTINATION OF OUTPUT |
|---|---|
| * | FA 501c |

| CONDITIONS | DESTINATION OF OUTPUT |
|---|---|
| * | FA 501c |

| CONDITIONS | DESTINATION OF OUTPUT |
|---|---|
| (COMPANY= C1 OR GROUP=Ga OR REGION=Ra) AND CONTENT=X | DA 501d |
| (COMPANY=C1 OR GROUP=Ga OR REGION =Ra) AND (CONTENT =Y OR CONTENT=Z) | DA 501e |
| (COMPANY=C2 OR GROUP = Gb OR REGION =Ra) | FA 502c |
| (COMPANY=C3 OR GROUP=Gb OR REGION =Rb) | FA 503b |

| CONDITIONS | DESTINATION OF OUTPUT |
|---|---|
| * | DA 501d (=ACCESSES A DB) |

| CONDITIONS | DESTINATION OF OUTPUT |
|---|---|
| * | DA 501e (=ACCESSES A DB) |

| CONDITIONS | DESTINATION OF OUTPUT |
|---|---|
| * | FA 502c |

| CONDITIONS | DESTINATION OF OUTPUT |
|---|---|
| * | FA 502c |

| CONDITIONS | DESTINATION OF OUTPUT |
|---|---|
| (COMPANY=C1 OR GROUP=Ga OR REGION =Ra) | FA 501c |
| (COMPANY=C2 OR GROUP = Gb OR REGION =Ra) | DA 502d |
| (COMPANY=C3 OR GROUP=Gb OR REGION =Rb) | FA 503b |

| CONDITIONS | DESTINATION OF OUTPUT |
|---|---|
| * | DA 502d (=ACCESSES A DB) |

| CONDITIONS | DESTINATION OF OUTPUT |
|---|---|
| (COMPANY !=C3 OR GROUP='*' OR REGION=Ra) | FA 503b |
| (COMPANY =C3 OR GROUP=Gb OR REGION =Rb) | FA 503c |

| CONDITIONS | DESTINATION OF OUTPUT |
|---|---|
| (COMPANY=C1 OR GROUP =Ga OR REGION =Ra) | FA 501c |
| (COMPANY=C2 OR GROUP=Gb OR REGION=Ra) | FA 502c |
| (COMPANY=C3 OR GROUP=Gb OR REGION=Rb) | FA 503c |

| CONDITIONS | DESTINATION OF OUTPUT |
|---|---|
| CONTENT=X | DA 503d |
| CONTENT=Y | DA 503e |
| CONTENT =Z | DA 503f |

| CONDITIONS | DESTINATION OF OUTPUT |
|---|---|
| * | DA 503d (=ACCESSES A DB) |

| CONDITIONS | DESTINATION OF OUTPUT |
|---|---|
| * | DA 503e (=ACCESSES A DB) |

| CONDITIONS | DESTINATION OF OUTPUT |
|---|---|
| * | DA 503f(=ACCESSES A DB) |

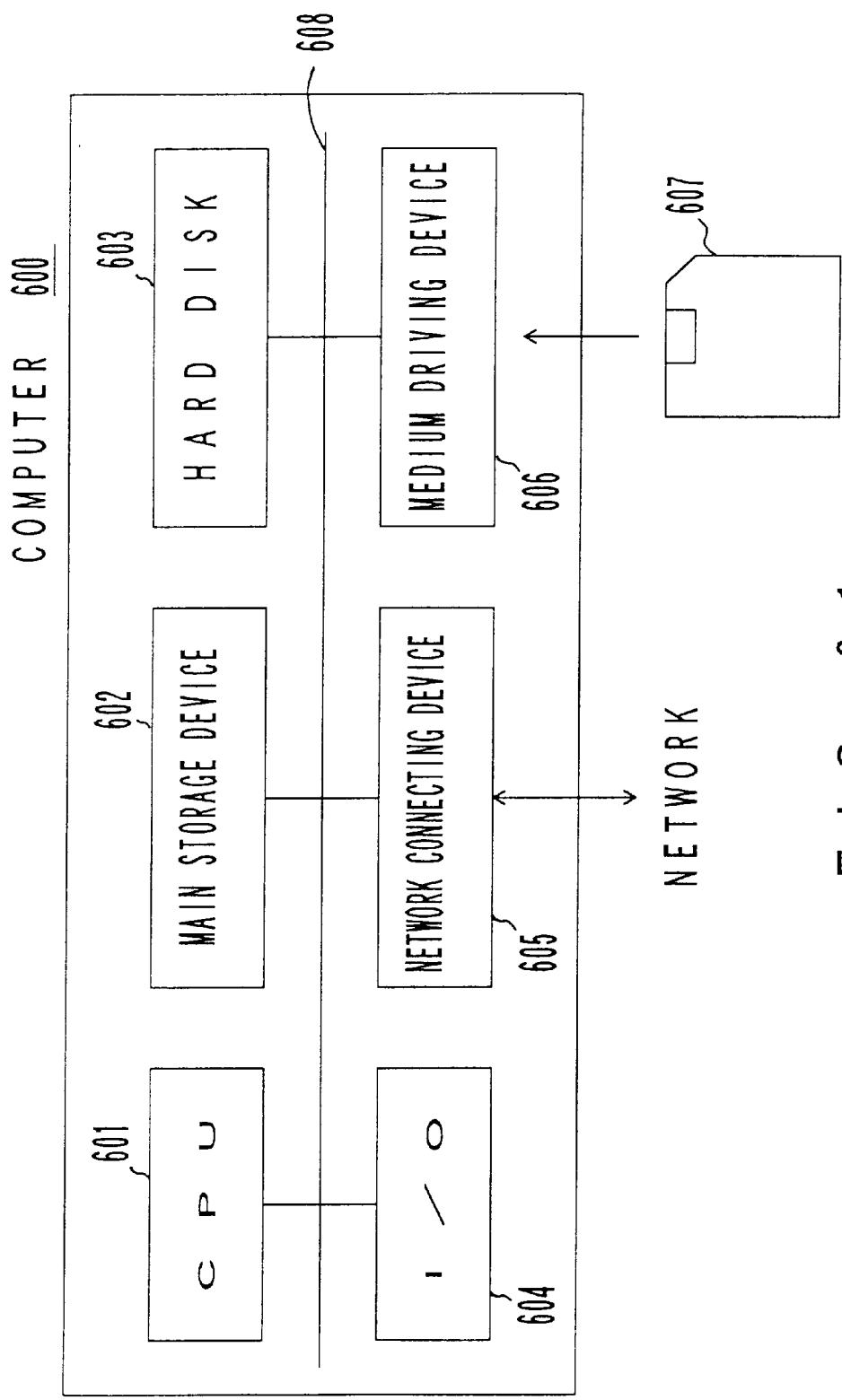
F I G. 31

DATABASE MECHANISM, MEDIATING METHOD IN DATABASE SYSTEM AND PROGRAM STORING MEDIUM FOR IMPLEMENTING DATABASE SYSTEM

BACKGROUND OF THE INVENTION

1. Field of the Invention

The present invention relates to a database, method and program storing medium, and particularly to a database system, a mediating method in the database and a program storing medium for implementing the database system realized by distributing a process for mediating between a user and a database called an agent when there exist one or more users and a plurality of databases.

2. Description of the Related Art

With the recent developments in computers and computer networks, environments in which many computers are connected through a high-speed network are being prepared. Many databases operating in one computer are becoming available.

However, these databases provide different contents with different using procedures. Therefore, it is becoming difficult for a user to retrieve a database most suitable to his or her requirement. It is also becoming a heavy burden for a user to master the different procedures for each database.

For example, although today there exist many document databases on the Internet, it is necessary for the user to know where a database is in order to utilize the database. There is a database in which a document is registered comprehensively, and a database which holds only information on a specific field. Therefore, the user has to select a suitable database meeting his or her needs. Further, the procedures of using databases are generally different. Therefore, the user has to carry out each retrieval process individually while referring to an instruction book for each database.

These days CALS (Common Acquisition and Life-cycle Support) and EC (Electronic Commerce) have become popular. In these activities systems for procuring, managing, advertising, and selling and buying products electronically are being extensively developed and put into practice. However, also in this electronic trade, there are the problems of the selection and using procedure of a database.

For example, purchasers request to obtain the latest information on a product from the database of a plurality of producers, select the producer who meets his or her expectations most satisfactorily, and purchase products from the producer. On the other hand, producers request to find out desirable customers who are interested in his or her products, access a database of purchasers for the purpose of support after they deliver his or her own products to purchasers, and obtain information on the operation of his or her delivered products. In this way, there actually exists a strong need for referring to or utilizing databases reciprocally among companies.

However, differences in format and using procedures of databases often exist, among companies as well as within one company, which is a great obstacle in the reciprocal utilization of databases. When it is used in actual business, it is necessary to protect the security of information and to strictly manage the authority to use, which are other problems.

To solve these problems, a method for using a program called an agent in a network and making the agent mediate between a user and a database is proposed. The agent knows the contents and using procedures of many databases, selects a database, eliminates the differences in using procedure, and verifies the authority to use. From the user's point of view the agent looks a virtual integrated database in which many databases are integrated.

In the technological background described above, when a plurality of users and a plurality of databases exist, the present invention is intended to provide a mechanism for mediating between users and databases. The following users and databases are assumed for this facilitation mechanism. In an environment where a plurality of databases are operated on different models of computers, in a so-called different model distributed database environment, this state often occurs.

Since generally a plurality of users exist, a plurality of formats of requests issued by users and replies received by users exist.

Since generally a plurality of databases exist, a plurality of formats of requests issued by databases and replies received by databases exist.

On this assumption this facilitation (mediating) mechanism of the database system aims to realize the following functions, as shown in FIG. 1. In the diagram are shown a user 1, a facilitation mechanism 2 and databases 3 to 6. In this specification a requesting side and a replying side are called a user and a database, respectively, and the present invention is not limited to a user in a narrow sense and a database in a narrow sense. Generally a person who can request and reply properly, information equipment, programs, etc. can be a requesting side (a user in the present invention) and a replying side (a database in the present invention).

The process from receiving a request to databases 3 to 6 from a user to replying to the request, in the facilitation mechanism 2, is shown below. The following items (1) to (5) correspond to processes (1) to (5) shown in FIG. 1.

(1) A facilitation mechanism receives a request according to an output procedure designated by a user (2) The facilitation mechanism selects a database suitable for processing the request out of databases 3 to 6 according to the request of the user 1. A plurality of databases can be often selected.

(3) The facilitation mechanism sends the request according to an input procedure designated by the selected database.

(4) The facilitation mechanism receives a reply according to an output procedure designated by the selected database. When a plurality of databases are selected, the facilitation mechanism collects a plurality of replies.

(5) The facilitation mechanism sends the reply according to an input procedure designated by the user 1.

To simplify this facilitation mechanism, a method using a concentrated configuration can be considered. FIG. 2 explains a facilitation mechanism based on a concentrated configuration of mediating functions.

The concentrated configuration of a facilitation mechanism means a configuration where a facilitation mechanism 14 implemented by a program receives outputs from all the users 11 to 13, and inputs the outputs to all the databases 15 to 18, as shown in FIG. 2. After replies from the databases 15 to 18 are collected in the facilitation mechanism 14 by the reverse procedure, they are sent to the respective users who asked the questions. However, this concentrated configuration has the following problems.

Concentration of Load at the Time of Operation

Since all mediating work is carried out by one program, the load tends to become heavy. An increase in the number of users and databases directly leads to an increase in load, and the load cannot be distributed.

High Costs of Operation Managing Costs

If the operating form of the database system is that users and databases are registered with the database system, a design modification of a program is required every time the number of users and databases increases, which affects the whole system. Also a modification of the program is required every time an input/output format is modified, deleted or added, which also affects the whole system.

Cannot Protect the Security of Information

For example, although which database can receive which request can be confidential information in some cases, the security of such information cannot be protected, since in the concentrated configuration the information is collected in one place. For example, the facilitation mechanism 14 shown in FIG. 2 can access all the databases 15 to 18, and a manager of the facilitation mechanism 14 can obtain information from the databases 15 to 18 without any restriction.

SUMMARY OF THE INVENTION

It is an object of the present invention to solve the problems of the concentrated configuration such as the concentration of load at the time of operation, concentration of operation managing costs, and lack of the security protection of information.

The database system according to the present invention comprises facilitation mechanism for mediating between one or more users and a plurality of databases.

The above-mentioned mechanism for mediating between users and databases is composed of a plurality of agents being one of a user agent, a facilitation agent and a database agent provided corresponding to the above-mentioned database.

The above-mentioned user agent is provided with a unit for receiving one or more requests for the above-mentioned database from the above-mentioned user, and a unit for sending the requests to one or more other agents and outputting the result of the requests to the above-mentioned user.

The above-mentioned facilitation agent is provided with a unit for receiving one or more requests sent from one or more other agents, and a unit for selecting one or more other agents to whom the one or more requests are to be sent and sending the one or more requests to the agent.

The above-mentioned database agent is provided with a unit for receiving the one or more requests sent from one or more other agents, a unit for accessing the above-mentioned corresponding database according to the one or more requests, and a unit for returning the result of an access to a requester.

The above-mentioned facilitation mechanism is, for example, provided with a first stage process for selecting one or more databases and a second stage process for processing one or more requests for the one or more selected databases. The selection of one or more databases by the above-mentioned facilitation mechanism is carried out by conveying a request for the above-mentioned database to a plurality of the above-mentioned agents using the condition held by the above-mentioned agent.

The plurality of the agents composing the above-mentioned facilitation mechanism are arranged on a plurality of computers. The above-mentioned one or more users, a plurality of the above-mentioned databases and the above-mentioned facilitation mechanism can also be configured on one computer.

It can be so configured that the above-mentioned agents may be divided into processes operable in parallel for each processing.

If the database system of the present invention is utilized, such a facilitation mechanism is realized that scalability for an increase in the number of users, the addition of databases, etc. may be secured, operation load and operation managing costs may be distributed, and security of information may be protected.

BRIEF DESCRIPTION OF THE DRAWINGS

FIG. 6 is an example showing a request format from a user intended for this embodiment.

FIG. 7 is an example showing a configuration of the condition table possessed by an agent.

FIG. 13 is a flowchart of an input receiving unit of a user agent and a database agent.

FIG. 17 is a flowchart of a database selecting request process routine.

FIG. 19 is a flowchart of a database operating request process routine of a user agent.

FIG. 23 is a flowchart of an input receiving unit of a facilitation agent.

FIG. 28A, FIG. 28B, FIG. 28C, FIG. 28D and FIG. 28E are examples showing condition tables possessed by agents UA502a, UA502b, FA502c, DA502d and DA502e, respectively.

FIG. 29A, FIG. 29B, FIG. 29C and FIG. 29D are examples showing condition tables possessed by agents UA502a, UA502b, FA502c and DA502d, respectively.

FIG. 30A, FIG. 30B, FIG. 30C, FIG. 30D, FIG. 30E and FIG. 30F are examples showing condition tables possessed by agents UA503a, FA503b, FA503c, DA503d, DA503e and DA503f, respectively.

FIG. 31 is an example showing a configuration of a computer system.

DESCRIPTION OF THE PREFERRED EMBODIMENT

Figure 1:
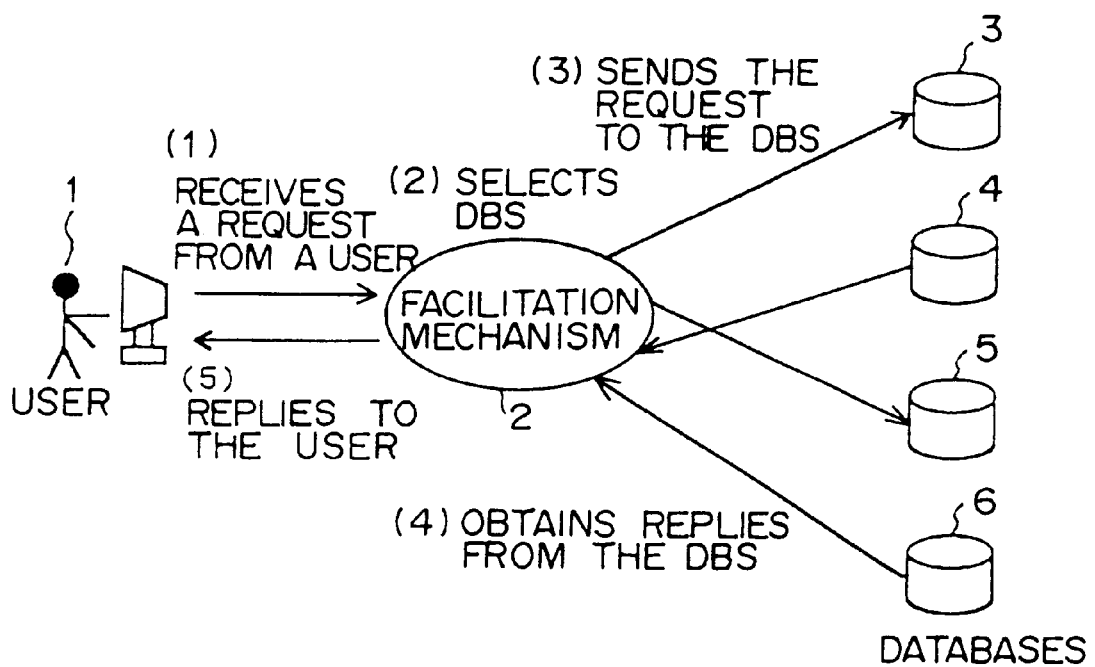
FIG. 1 explains the functions required in a facilitation mechanism of a database system.
Figure 2:
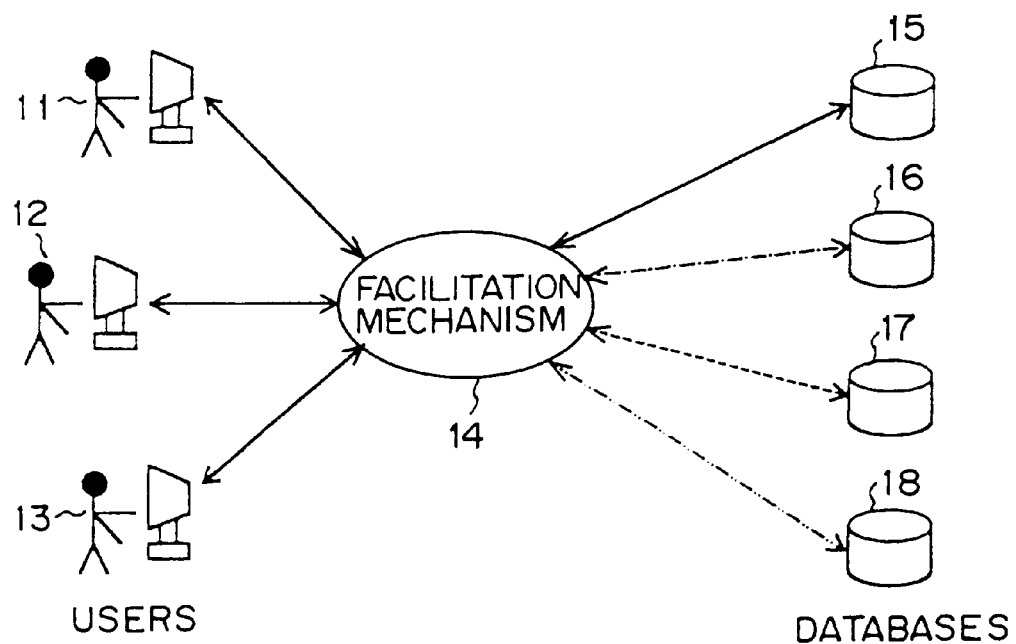
FIG. 2 explains a facilitation mechanism of concentrated configuration.
Figure 3:
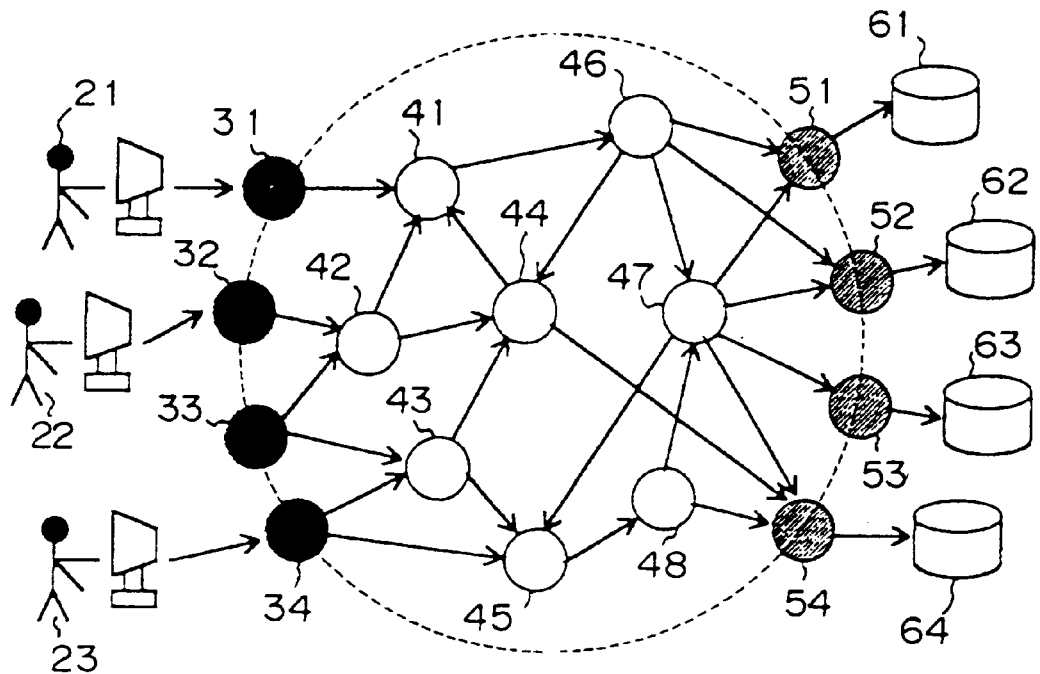
FIG. 3 explains the principle of the present invention.

FIG. 3 explains the principle of the present invention.

The present invention realizes one facilitation mechanism by using a plurality of processes having a communicating function called an agent. Although the agent generally operates on a plurality of computers, sometimes only one agent operates on one computer, and sometimes a plurality of agents operate on one computer.

As shown in FIG. 3, a facilitation mechanism of distributed configuration is composed of three kinds of agents. The classification and role of each agent is as follows.

User Agent

User agents 31 to 34 are agents for interfacing users 21 to 23 with an agent block (the entire facilitation mechanism). If an access method and a required reply format differ for each user, the difference is eliminated by agents 31 to 34. Even when the number of users increases, the facilitation mechanism can correspond to it by increasing the number of the user agents locally without modifying the entire agent block.

Facilitation Agent

Facilitation agents 41 to 48 are agents for mediating between user agents 31 to 34 and database agents (hereinafter called DB agents) 51 to 54. The user agents 31 to 34 select DB agents 51 to 54 by sending a request to the facilitation agents 31 to 38.

DB Agent

DB agents 51 to 54 are agents for interfacing databases 61 to 64 with an agent block. The difference in using procedure and replying format of databases 61 to 64 are eliminated by the DB agents 51 to 54. Even when databases are added, the facilitation mechanism can correspond to it by adding corresponding DB agents without modifying the entire agent block.

The facilitation mechanism described above can also be implemented by a program. The program can be stored in a proper computer-readable storing medium. In this case, a user agent, a facilitation agent and a DB agent can be operated by loading the program from the storing medium to a memory of a computer and executing the program.

The embodiment of the present invention is described below, referring to the drawings.

1. System Configuration

Figure 4:
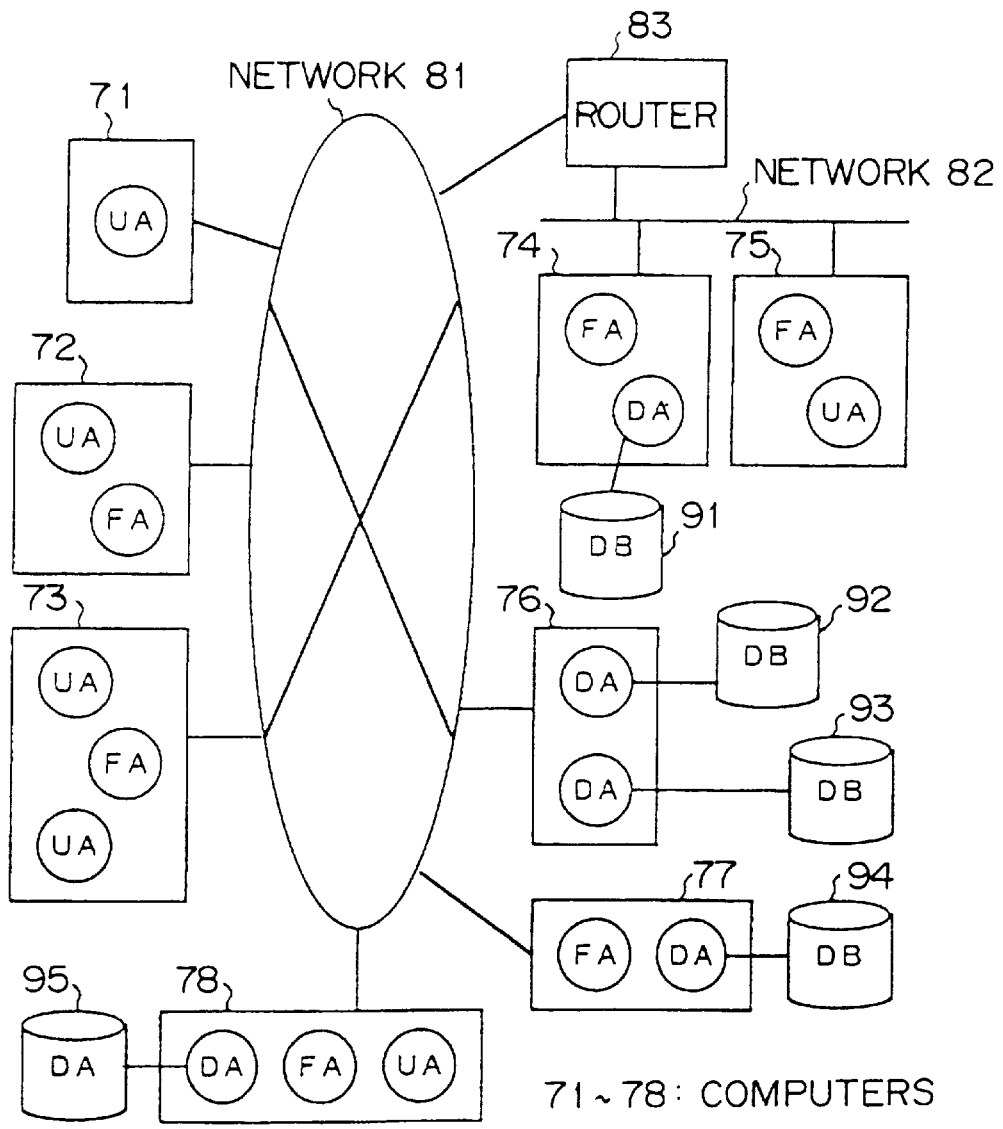
FIG. 4 is an example showing a configuration using a distributed network system of this embodiment.

FIG. 4 shows an example of a system of this embodiment.

FIG. 4 is an example showing a configuration in the case where a database system is configured as a distributed system on a plurality of computers connected with each other in a network. In the case of FIG. 4, each user, each database and the facilitation mechanism are distributed and configured on eight computers 71 to 78, and a system is configured by connecting the computers with each other in a network.

In FIG. 4, computers 71 to 78 are computers consisting of a central processing unit (CPU), a memory, etc. A user agent UA, a facilitation agent FA and a DB agent DA are agents composing a facilitation mechanism of this embodiment. A router 83 connects the parts of the database system having networks 81 and 82 such as a WAN, LAN, etc. with each other.

Each of agents UA, FA and DA has a function to communicate with other agents. These agent blocks generally operate on a plurality of computers. Sometimes only one agent operates on one computer, and sometimes a plurality of agents operate on one computer. Corresponding to each of the databases 91 to 95 distributed among a plurality of computers, DB agents DAs for accessing the databases 91 to 95 are assigned.

For example, when a user of a computer 72 makes a database selecting request through a user agent UA, the destinations of the request is decided in order according to the conditions of the request. When the destination of the request is a database 91, it is so configured that a database 91 may be selected through a facilitation agent FA in the computer 72 for a network 81, a network 82 and a computer 74 and a database agent DA. When for one request a plurality of databases are corresponded, a plurality of databases are selected.

Figure 5:
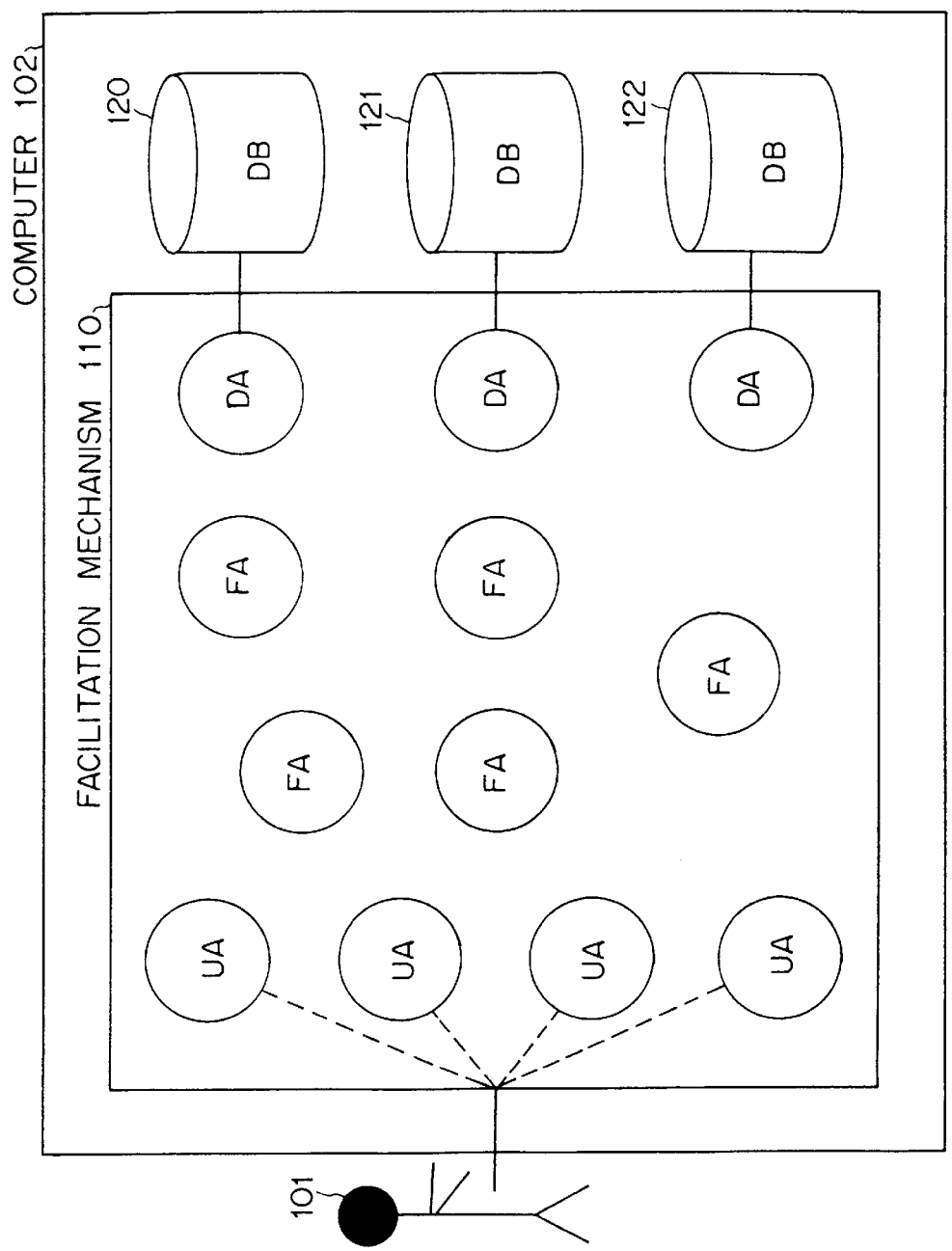
FIG. 5 is an example showing a stand-alone configuration of this embodiment.

The present invention is not limited to being implemented on a plurality of computers in a distributed system connected in a network as shown in FIG. 4, but can also be implemented on a stand-alone computer as shown in FIG. 5.

In this case, a computer manages a plurality of users by a multi-user corresponding operating system (OS) such as UNIX.

In this case, it is so configured that user agents may be provided for each user department, for example, a user agent in which researchers and developers are registered, a user agent in which accountants are registered, etc. may be provided, and each user agent may be managed by a different manager. For a request from a user, a user agent corresponding to the user's department is selected, and the selected agent mediates between the user and a database corresponding to the request.

Thus, for example, even when modification of registration such as a new registration of an accountant, modification of the password of an accountant, etc. is carried out, it can be handled by only a limited part of a user agent for the accounting department and the manager, and the security of this registration modification can be protected from other departments.

For a request from a user, a user agent is selected corresponding to the user's department, and the selected agent mediates between the user and a database corresponding to the request.

In the case of FIG. 5, out of four user agents UAs a user agent corresponding to a user 101 logged onto a computer 102 is selected.

When the user 101 makes a database selecting request through the selected user agent UA, in the same way as in FIG. 3, the destination of the request is decided according to the conditions of the request in a facilitation mechanism 110. By conveying the database selecting request to agents in the facilitation mechanism 110, one or more databases corresponding to the selecting request is selected from among the databases 120, 121 and 122.

In this way, even when the present invention is implemented on a stand-alone computer, the distribution of management load and reliable maintenance in system management can be realized by the implementation of the distributed configuration of a facilitation mechanism.

2. Operation of the Facilitation Mechanism of the Distributed Configuration 2.1 Request Procedure From a User Prior to the description of the operation of a facilitation mechanism, a request from a user which is given to the facilitation mechanism is described below.

FIG. 6 shows an example of a request format from a user intended for this embodiment. The request format from a user intended for this embodiment shall be limited to, for example, a format as shown in FIG. 6 in order to unify an interface. That is, for the request from a user, first, a request to select one or more databases shall be issued, then an arbitrary number of requests to the selected database shall be issued, and lastly a notice of terminating the request shall be issued to the selected database.

When a user knows the summary of a database, the user seems conscious of the difference between a request for selecting databases and a request to the selected databases. For this reason, even if this restriction is imposed, there occurs no great inconvenience in practical use. By imposing this restriction, the operation of a facilitation mechanism can be made corresponding to this pattern of request, being simple and easy to understand, which is a great advantage.

A request for selecting databases, a request to the selected databases, a notice for terminating the request, and a combination of the above-mentioned request and notice, shall be called a "DB selecting request", "DB operating request", "DB completing request", and "DB combined request", respectively, and a general term of these requests shall be called a "DB related request".

The sequence from the DB selecting request to the DB completing request shall be called one "session", and a user shall assign an exclusive identification number (session ID) to each session. The above-mentioned DB related request shall be sent to a facilitation mechanism together with the session ID. This is because when a DB operating request, etc. is made alone, it is necessary to identify to which DB selecting request the DB operating request is corresponds.

2.2 Operation of an Individual Agent

Each of the three kinds of agents perform basic operations and an extended operation. Basic operations of an agent means operations of distributing requests and collecting replies according to its own conditions. Each agent has the addresses of the other agents and a set of conditions which the agent has to meet when it sends a request to other agents. A table containing this set of conditions and addresses is called a "condition table".

FIG. 7 is an example showing a configuration of the condition table possessed by an agent. When a request is given to an agent, the agent refers to the condition table, and distributes the request to all the addresses which meet the conditions of this request. The agent collects all the replies to the request and replies to the original requester.

Although the basic operations include a time-out process and the avoidance of a duplicated request process, these are described in detail in 2.4 and 2.5.

Besides the above-mentioned basic operations, a user agent and a DB agent have an extended function of an interface function with a user and an interface function with a database defined, respectively.

2.3 Overall Operation of the Facilitation Mechanism

The operation of each agent in a facilitation mechanism is roughly divided into two stages. Because there is a strong possibility that different requests are repeated for an individual DB once it has been selected, the operation is divided into the following two stages.

The selection of databases and the request for the selected databases can be carried out simultaneously by one request without dividing the operation into two stages, if necessary.

Each stage in the case where the operation is divided into two stages is described below.

(1) Selection of an Individual DB Block

In the first stage, individual databases are first selected. All of the selected databases are called a DB block. An actual request is not yet transferred to the databases.

(2) Request Reply Process

In the second stage, an actual request is issued to the DB block obtained in the first stage, replies are collected, and are returned to the user.

These operations of the facilitation mechanism are described by referring to FIGS. 8 and 9.

Figure 8A:
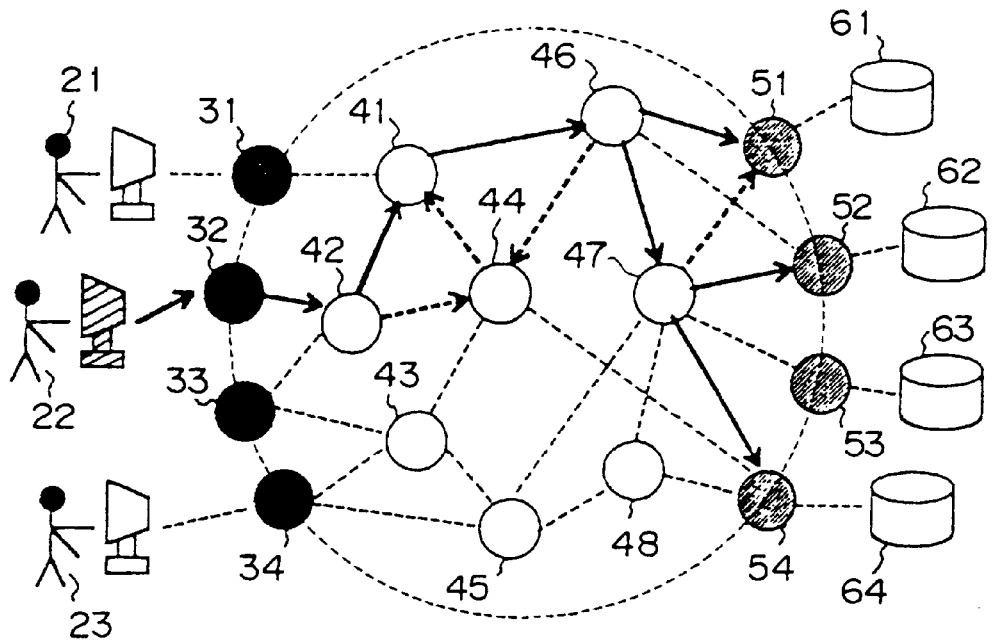
FIG. 8A is an example showing the distribution operation of a database selecting request of a facilitation mechanism.
Figure 8B:
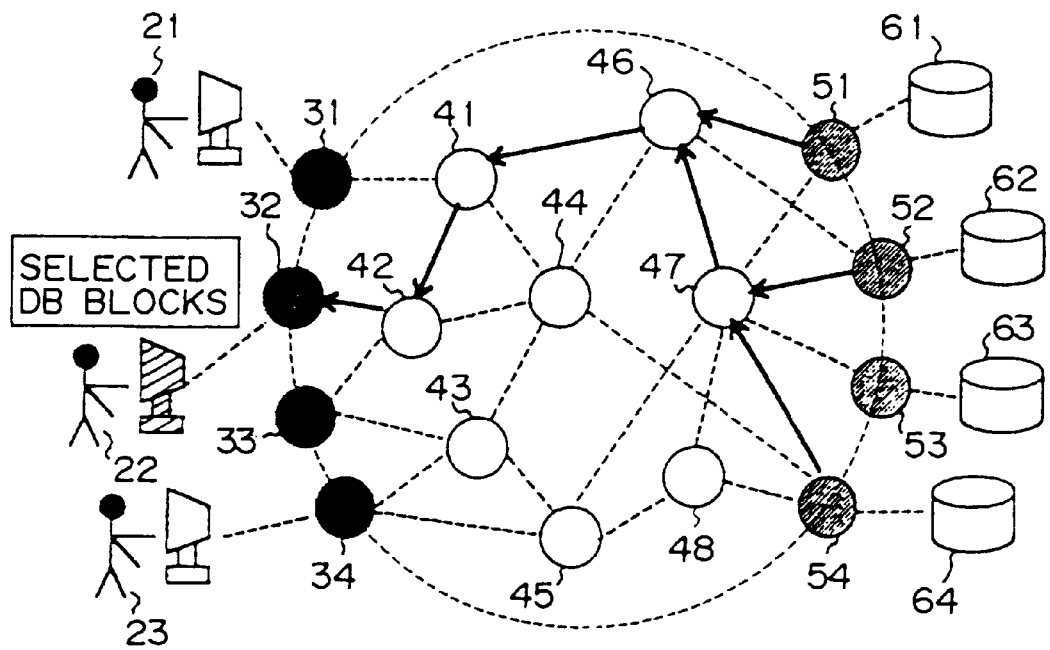
FIG. 8B is an example showing the collection operation of results.

FIGS. 8A and 8B are examples showing operations of the first stage of the facilitation mechanism.

In the first stage individual databases which meet the conditions of the user are selected. First, a user agent issues a DB selecting request according to the user's request. The DB selecting request is branched according to the condition table possessed by the facilitation agent which has received the request, and finally reaches a DB agent.

In the case of FIG. 8A, a user agent 32 receives a request from a user 22, and issues a DB selecting request. This DB selecting request is sent to facilitation agents 42, 41 and 46 in that order according to the condition table possessed by each facilitation agent. The number of agents which meet the conditions and to which the request is conveyed by each agent is not always 1. For example, in FIG. 8A, each of a facilitation agent 42, a facilitation agent 46 and a facilitation agent 47 conveys the request to two agents which meet its own conditions, that is, facilitation agents 41 and 44, a facilitation agent 47 and a DB agent 51, and DB agents 52 and 54, respectively.

When the request meets the conditions held in each of the DB agents, the DB agents 51, 52 and 54 which have received the request, return the names of the databases 61, 62 and 64 under their control to the agent which has sent the request. When the request does not meet the conditions held in each of the DB agents, the DB agents 51, 52 and 54 return an error code to the user. In this case, the name of a database means a network address consisting of an agent name and a host name, etc. by which connection with the database can be directly established.

When a request that is processed once comes back to the same agent, the agent returns an error code to the user and does not distribute the request according to a condition table. Dotted arrow marks shown in FIG. 8A represent the routes which are not correctly established because the same request arrives twice. For example, the same request is sent to a facilitation agent 41 from facilitation agents 42 and 44. In this case, the request sent last is eliminated as an error.

FIG. 8B shows a collecting process of the result of the DB selection. When replies or errors to all messages which each agent has issued are collected, the agent arranges them and returns a reply to a requester. For example, when all replies or error messages are collected from DB agents 52 and 54, a facilitation agent 47 arranges them and returns a reply to a facilitation agent 46. This operation is repeated, and finally all the replies are collected in the first user agent 32 through the reverse route. For this reason, the first user agent 32 is to have an aggregate (DB block) of names of databases 61, 62 and 64 which are selected by an agent block.

Figure 9A:
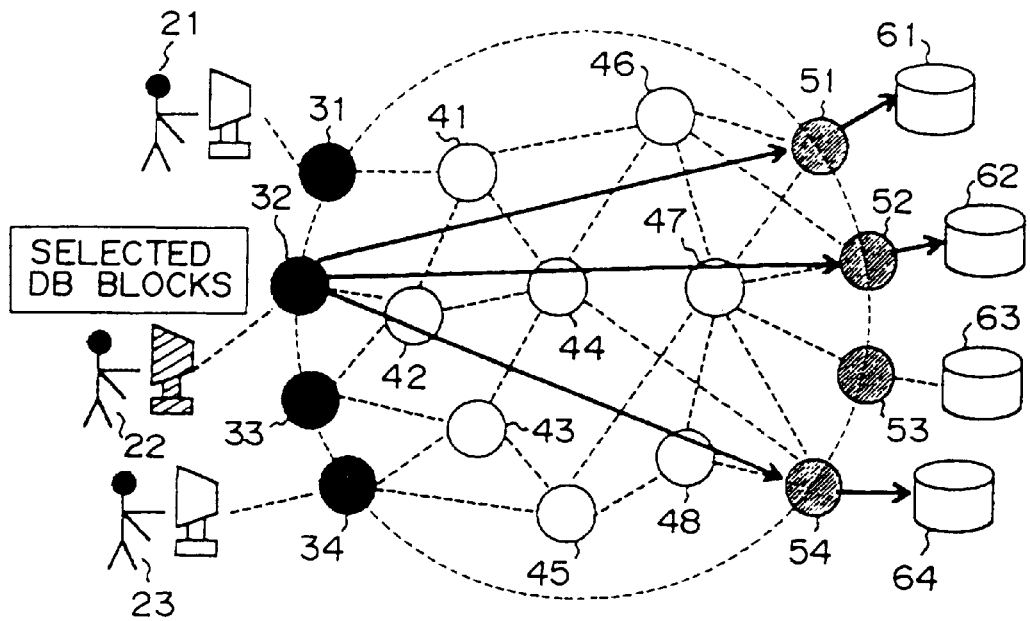
FIG. 9A is an example showing the distribution operation of a database selecting request of a facilitation mechanism.
Figure 9B:
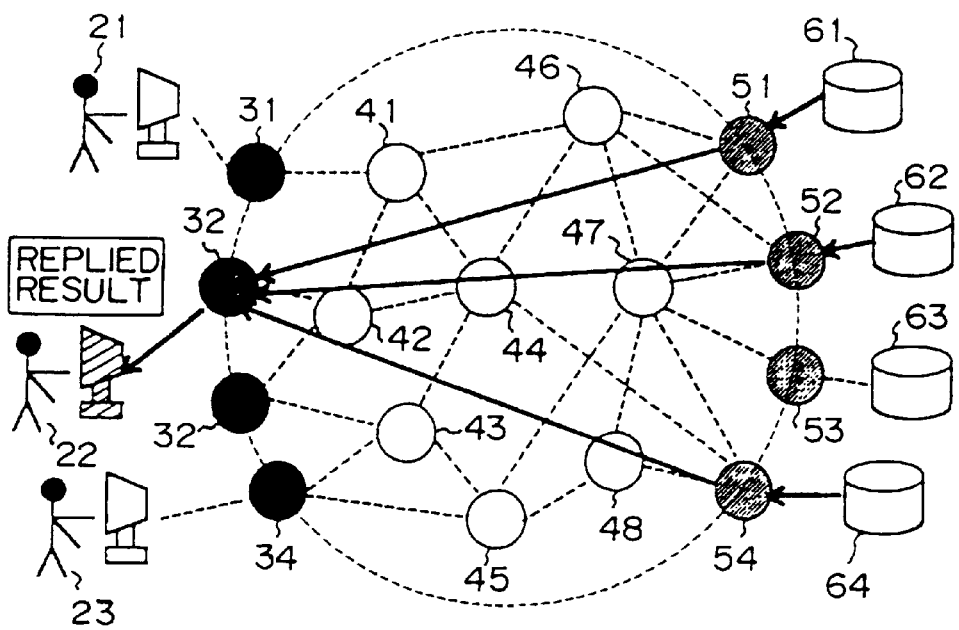
FIG. 9B is an example showing the collection operation of results.

FIG. 9A and 9B are examples explaining operations of the second stage of a facilitation mechanism.

In the second stage, as shown in FIG. 9A, a first user agent 32 sends a DB operation request directly to DB agents 51, 52 and 54 corresponding to the selected DB block. Each of the DB agents 51, 52 and 54 give the received request to databases 61, 62 and 64, and returns obtained replies to the user agent 32 as shown in FIG. 9B. The user agent 32 collects the replies obtained from the DB agents 51, 52 and 54, and returns them to a user 22. In this way, a reply is returned from the facilitation mechanism for a question issued by the user 22.

2.4 Time-out Process

When a system is configured based on a distributed configuration, a reply may not come back due to an unexpected operation of an agent, failure of a communication line, etc. In this case, it is necessary that the system does not continue to wait for a reply for a long time, but the system gives up waiting for the reply after a certain time has elapsed and an error process is executed. This process is called a "time-out process."

In a conventional time-out process the database system waits for a reply for a predetermined time period for each communication. However, when a facilitation mechanism is implemented based on a distributed configuration, communication is carried out many times consecutively. In this case, if the same time-out time period is set for all communication on the way, there is a possibility that unnecessary processes such as continuing to calculate a reply inside the database system despite the fact that the interface between the user and the database system is terminated by a time-out process, are executed, since the time periods necessary for the communication and calculating process are not taken into consideration in the database system.

For this reason, when communication is relayed many times, a system in which a time-out time period is decided taking into consideration process time period such as the communication time period on the way, calculating time period, etc., has to be considered. Here, two systems are proposed.

System 1: A system in which when to time-out is designated

This is a system in which a time-out process is designated to start at a specific time. The time-out time period for handing over the data to the next agent shall be the time which is calculated by subtracting the time period needed for its own reply process from the whole time period.

System 2: A system in which allowed time period against time-out period is passed on In this system, when the database system receives a request, it also receives the time period allowed to reply to this request at the same time. The agent which has received the request calculates the new allowed time period by subtracting the time period needed for its own request process and reply process from the received allowed time period. When the agent distributes the request to the next agent, it passes the new allowed time period to the next agent together with the request, itself waits for a reply only for the new allowed time period, and returns an error code to a requester if the reply does not arrive within this time period.

System 1 has an advantage that even if an agent has inaccurately estimated the time period needed for its own processes, unnecessary processes are not executed past the time period designated by the user, since time-out is controlled by clock time. This system also has a disadvantage that the clock time referred to by each agent has to be correctly set for all agents in advance.

System 2 has an advantage that the clock time referred to by each agent is not necessarily set correctly in advance because the time-out is managed, not by the clock time, but by the time period. When agents are operated in a distributed configuration, all clocks cannot be always expected to be correctly set. In such a case, system 1 using the clock time cannot be adopted. System 2 also has a disadvantage that there is a possibility that when an agent has insufficiently estimated the time period needed for its own processes, a process for preparing a reply is continued past the time period designated by the user.

As a result of considering all the points described above comprehensively, in this embodiment a system in which allowed time period against time-out period is passed on is adopted. However, of course the present invention can also be implemented in a system in which when to time-out is designated.

2.5 A System for Avoiding a Duplicated Request Process

Although each agent decides the next distributing destination of a DB selecting request according to a condition table as shown in FIG. 7, if there are a plurality of distributing destinations which meet the conditions set in the condition table, it distributes the same request to each of the distributing destinations. When the route for distributing the request is looped, the database system is inefficient, since the same request is repeatedly processed until the system times out, unless some measures are taken. There is also a possibility that several requests copied from the same original request are distributed to the same agent. In this case, the database system also becomes inefficient, since the same request is repeatedly processed in vain.

To avoid this situation, here, a system in which a user agent initiating a request attaches an identification number (request ID) to each request is adopted. The identification numbers shall be serial numbers not overlapping through the whole system. These numbers can be easily created, for example, by combining a name (host name, etc.) of the computer operated by the user agent in a network with a sequence number or time of issuing a request.

Each agent has a record of request IDs of the requests which the agent has processed. When a new request is given, the agent compares the request ID of the request with the recorded ID numbers. When the same request ID is found in the record, an error code is returned, since it means that the request has arrived twice.

Since the number of request IDs stored by each agent is limited, old request IDs have to be deleted. Several ways of deleting request IDs of the old requests from the storage are considered. For example, a method in which when the number of old stored request IDs reaches a predetermined limit, the excess of older request IDs are deleted; and a method in which when a certain time period passes after a request is processed, the old request IDs stored over a certain time period are deleted, are considered. Since in the former a fixed number of the old request IDs always exist, it takes time to compare a new request ID with the old request IDs. In the latter it is necessary to properly decide on a waiting time period until deletion.

In the present invention, although either of the above-mentioned two methods can be used, in this embodiment the method in which when a certain time period passes after a request is processed, the old request IDs stored over the certain time period are deleted, is adopted. That is, a request ID of a certain request is deleted after an allowed time-out time period attached to the request passes. The reason why a duplicated request process does not occur in this method is described below.

It is assumed that after a request is branched into two requests, the two requests reach an agent. The agent holds a request ID of the request which arrives first for the allowed time-out time period of the request. An allowed time-out time period means the time period after which when a message is sent, the message reaches the user agent who has created the request first, immediately before the user agent times out.

Whether or not there is the case where after this allowed time-out time period passes, a request having the same request ID reaches the agent, is studied below. The request having the same request ID reaches the agent in a roundabout way compared with the first request. For this reason, even when a reply is made from this agent, the reply is conveyed through the same route in a roundabout way. Therefore, in this case the allowed time-out time period attached to the last request has to be shorter than the allowed time-out time period of the first request. That is, unless a reply to the last request is made earlier than the first request reply, the last request reply should not reach the next agent earlier than or at the same time as the first request reply. It is theoretically impossible that after the allowed time-out time period of the first request passes, another request having the same request ID reaches the agent. For this reason, it can be said that allowed time-out time period of the first request is sufficient time period for holding a request ID.

However, it is anticipated that a case may occur where the exact time needed for an agent's process cannot be estimated when the agent actually conveys the allowed time-out time period to the next agent. Therefore, it is practically desirable to record a request ID for a little longer than the given allowed time-out time period.

Since there is a limit to the number of request IDs stored, a method in which when the number of old stored request IDs reaches a predetermined limit, the excess of older request IDs are deleted, is also used simultaneously. However, this is used only when sufficient storage capacity cannot be secured, and it is a supplementary method.

3. Modular Structure and Flowchart of Each Agent 3.1 In the Case of User Agent

Figure 10:
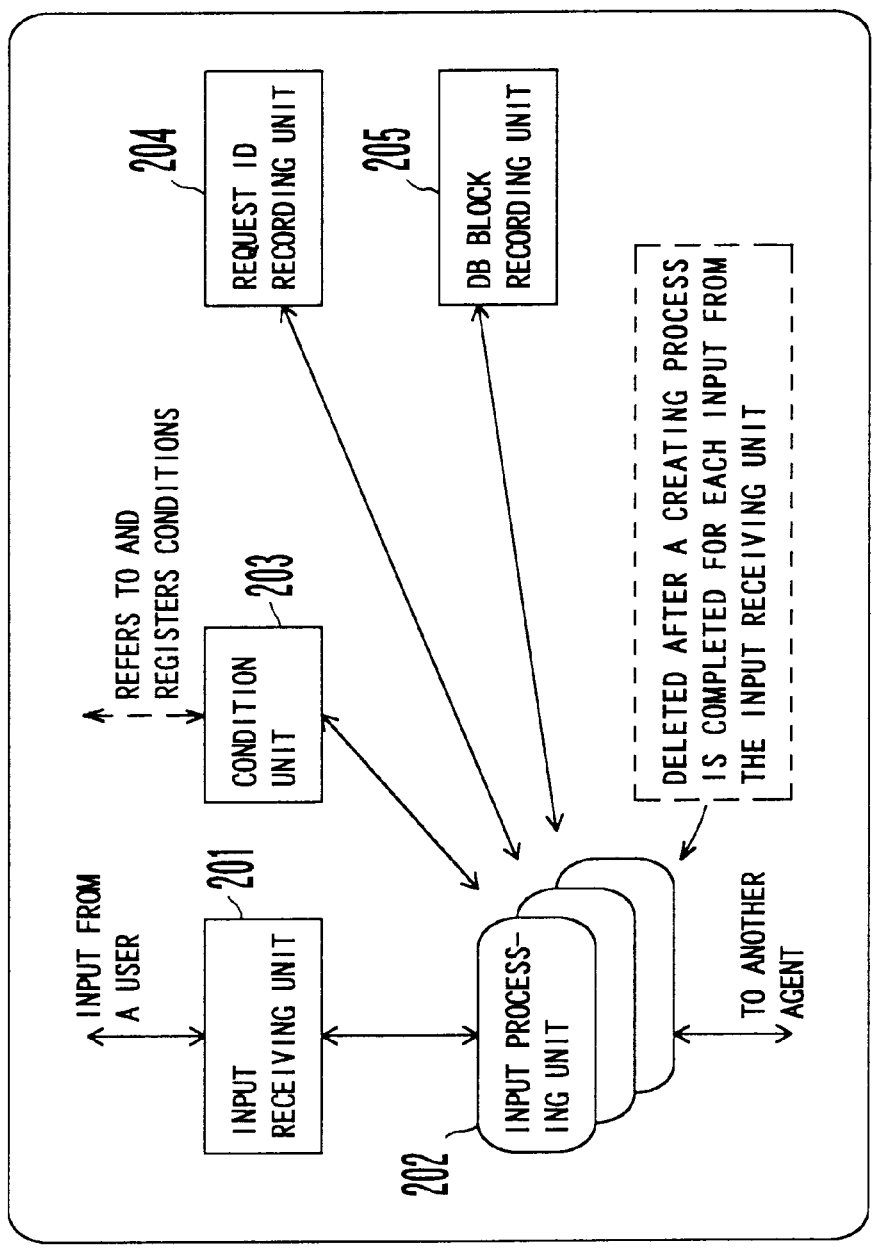
FIG. 10 is a diagram showing the modular structure of a user agent.

FIG. 10 shows the modular structure of a user agent. The user agent internally comprises a plurality of processes operable in parallel. In FIG. 10 an input receiving unit 201, a condition unit 203, an request ID recording unit 204 and a DB block recording unit 205 are all resident type processes and continue to operate waiting for an external input from when a user agent is started until a terminating request is issued. An input processing unit 202 is generated every time an external input arrives at the input receiving unit 201.

A practical process is executed mainly by the input processing unit 202 as the input processing unit 202 communicates with other internal processes and other agents. The input processing unit 202 is generated for every external input so that the reaction of a facilitation mechanism may not seem inactive from the user's point of view, because when an input is handled by one process, the flow cannot proceed to the next process unless the input is terminated. In the following description "unit" and "routine" mean an internal process independently operable and a sub-routine composing a part of an internal process, respectively.

Figure 11:
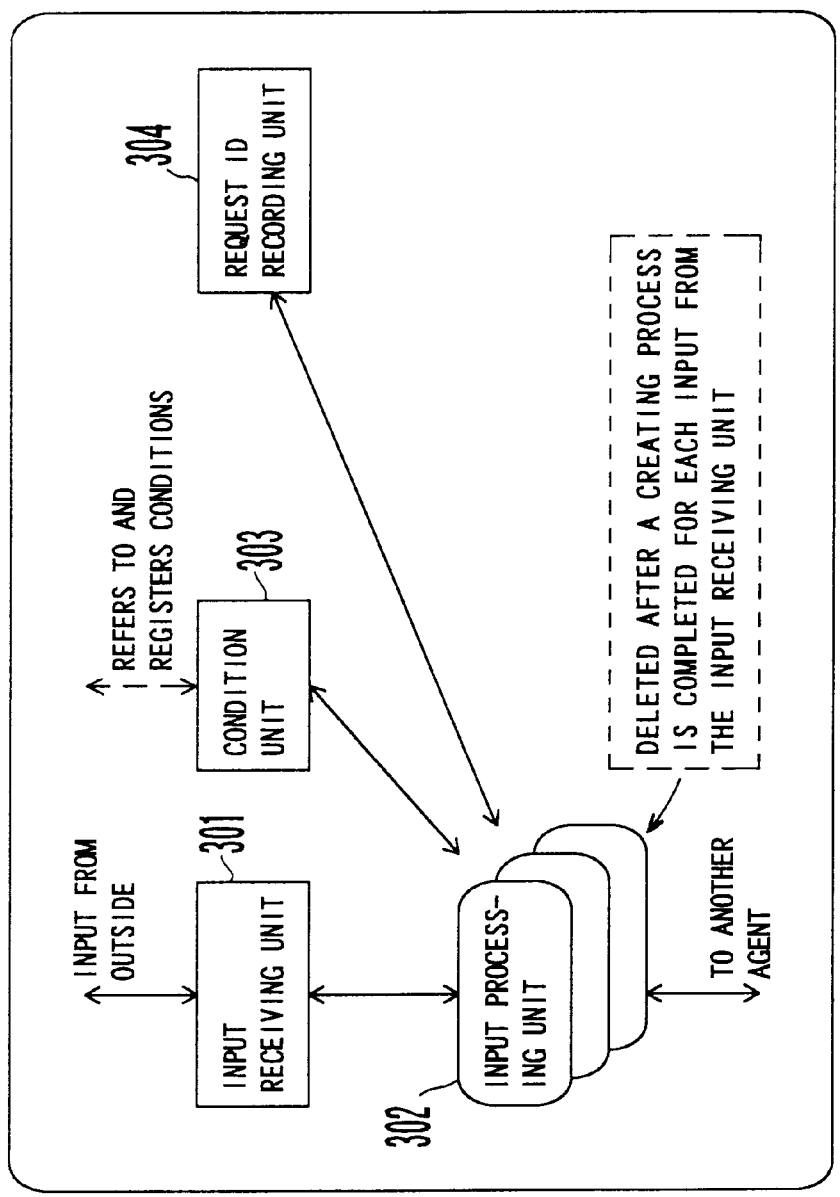
FIG. 11 is a diagram showing the modular structure of a facilitation agent.

The input receiving unit 201 has the same specifications as the input receiving unit 301 of a facilitation agent shown in FIG. 11. The input receiving unit 201 checks a request sent from a user, starts the input processing unit 202 and requests the input processing unit 202 to process the request. When a terminating request is given by a manager, the process of the input receiving unit 201 is terminated. When internal information such as information for debugging, access record, etc. is requested, the input receiving unit 201 returns that information. Internal information specifically means route-tracing information for debugging, information of the number of processed items for each time zone for operation and management, etc.

The input processing unit 202 is generated by the input receiving unit 201 every time the input receiving unit 201 receives an input from a user, and it is lost when its own process is terminated. Therefore, if the input receiving unit 201 receives a new input before the process of the input processing unit 202 is terminated, another input processing unit 202 is generated. In this case, a plurality of input processing units 202 can exist in the same agent.

When a DB combined request arrives, the input processing unit 202 analyzes this into individual DB related requests, passes each of the individual DB related requests to each individual request process routine and processes them there.

The input processing unit 202, and the input processing units 302 and 402 of a facilitation agent and a DB agent, respectively, send the request received from the input receiving unit to all output destinations meeting the conditions of the request. The input processing unit of each agent stores the requester which has sent this request to the agent and the output destination to which the agent has sent this request, and when all replies are collected from the output destination or the input processing unit times out, the input processing unit of each agent returns a reply to the sender. By this process a request can be distributed, and results can be collected as shown in FIGS. 8A and 8B.

The DB block recording unit 205 stores a DB block selected by a DB selecting request using a session ID as a key, and corresponds to retrieval, deletion, etc. of the DB block. Recorded information is, for example, as follows.

(Session ID1, {DB11, DB12, . . . })
(Session ID2, {DB21, DB22, . . . })

DBXX of the above-mentioned recorded information means the name of each database such as a network address, etc.

Figure 12:
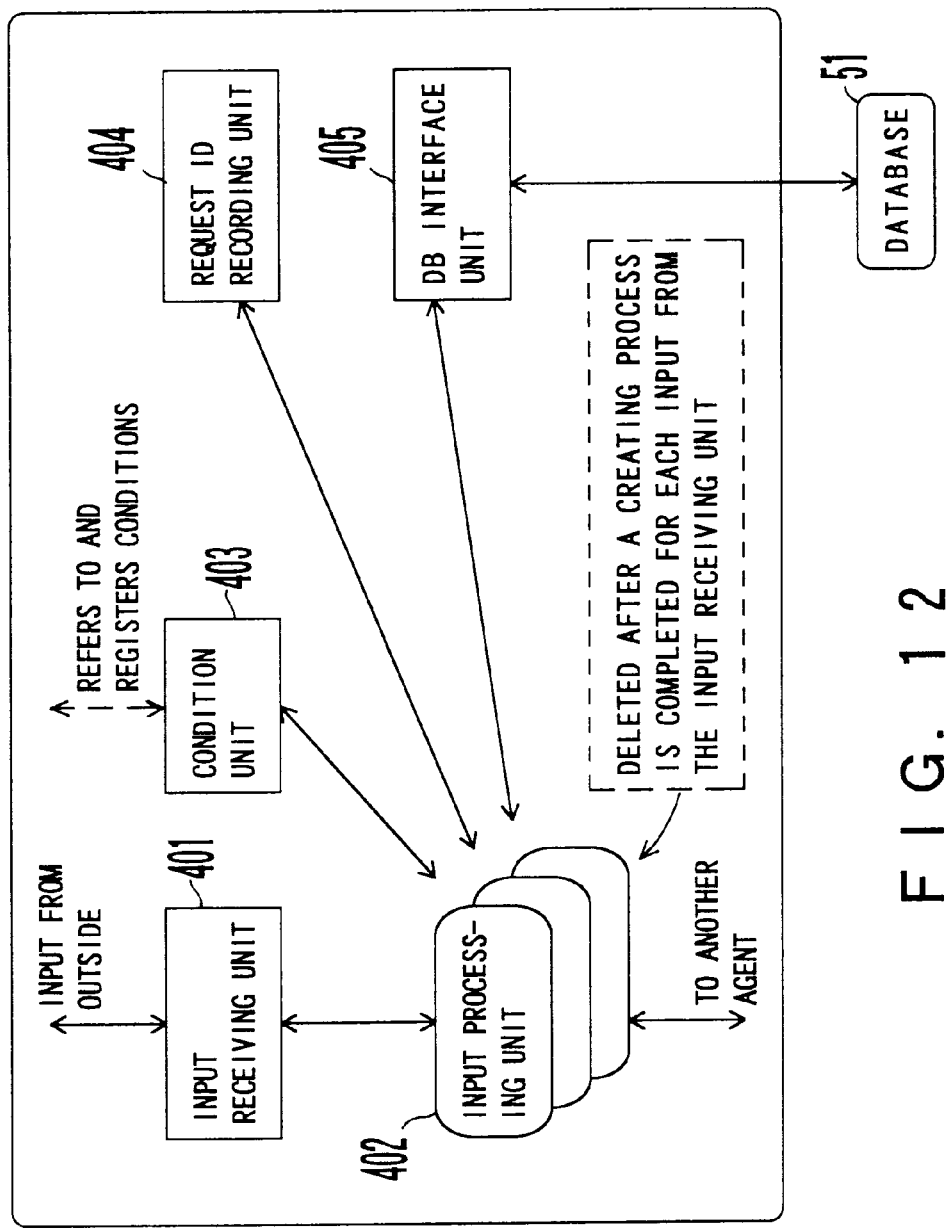
FIG. 12 is a diagram showing the modular structure of a database agent.

The specifications of the condition unit 203 and request ID recording unit 204 are the same as the specifications of the condition unit 303 and request ID recording unit 304 of a facilitation agent (FIG. 11), and the condition unit 403 and request ID recording unit 404 of a DB agent (FIG. 12).

The condition unit 203 stores a condition table for deciding the distributing destination of a request as shown in FIG. 7, and returns the condition table according to a request from the input processing unit 202. The condition unit 203 also registers new conditions from the manager of an agent, and deletes requests.

The request ID recording unit 204 is an internal process for recording identification numbers (request IDs) of the request processed before, and allowed time-out time period of the request. The request ID recording unit 204 mainly receives registering requests and retrieving requests. In the request ID recording unit 204 a limit is set for the recordable number of request IDs, and if a request is recorded over this limit, the request is overwritten on an old request ID. When a retrieving request is made, the request ID recording unit collates the request with the past request IDs stored in order.

If the same request ID is found, the request ID recording unit returns the ID. If the same request is not found, it replies that no same request exists.

As described in 2.5, when the allowed time-out time period of the agent has elapsed, the request ID can be deleted. In this embodiment a deleting process is not provided separately, and when a request ID sufficiently old is found while retrieving, the request is to be deleted.

Besides the above there are an individual request process routine and a DB operating request process routine. Though they are not internal processes, but are large process units. These are described later when process flowcharts are described.

3.2 In the Case of a Facilitation Agent

As shown in FIG. 11, a facilitation agent is composed of four kinds of internal processes operable in parallel, that is, an input receiving unit 301, an input processing unit 302, a condition unit 303 and a request ID recording unit 304. In the same way as a user agent, the input processing unit 302 is a process of which a plurality can exist simultaneously, and is generated every time the input receiving unit 301 receives an external input, and is lost when its own process is terminated, and the others are resident processes.

The input receiving unit 301 checks using a request ID whether or not a request externally input is a duplicated request (a request processed before). If it is a duplicated request, the input receiving unit 301 returns an error code. If it is a DB selecting request, it starts the input processing unit 302, and requests to process the request.

Since a request given to the input processing unit 302 is only a DB selecting request, the input processing unit 302 calls up a DB selecting process routine described later, as it is.

The condition unit 303 and request ID recording unit 304 are common to all agents, and they execute the same process as described by referring to FIG. 10 in the condition unit 203 and request ID recording unit 204 of a user agent.

3.3 In the Case of a DB Agent

As shown in FIG. 12, a DB agent is composed of five kinds of internal processes operable in parallel, that is, an input receiving unit 401, an input processing unit 402, a condition unit 403, a request ID recording unit 404 and a DB interface unit 405. In the same way as a user agent, the input processing unit 402 is a process of which a plurality can exist simultaneously, and is generated every time the input receiving unit 401 receives an external input and is lost when its own process is terminated.

The specifications of the input receiving unit 401 are the same as the specifications of the input receiving unit 201 of the user agent shown in FIG. 10.

When a DB selecting request reaches the input processing unit 402, the input processing unit 402 calls up a DB selecting process routine described later. If the request is a DB operating request, the input processing unit 402 transfers the request to the DB interface unit 405.

The DB interface unit 405 communicates with a database, requests processing of the request, and receives a reply. Since the DB interface unit 405 is so configured as to process only one request at a time, the DB interface unit 405 also corresponds to a database which cannot receive a plurality of requests simultaneously. This configuration where only one request can be processed simultaneously is not exclusive, and a configuration where a plurality of requests can be processed depending on the specifications of a corresponding database is also acceptable.

The condition unit 403 and request ID recording unit 404 are common to all agents, and they execute the above-mentioned processes.

3.4 Process Flow of Each Unit

FIG. 13 is a flowchart showing the process of an input receiving unit 201 of a user agent and an input receiving unit 401 of a DB agent.

Input information received in the input receiving units 201 and 401 are one of information of (a) a session ID and a DB related request, (b) a terminating request, and (c) an internal information request. Out of these requests both the terminating request and the internal information request are mainly issued by a system manager. The terminating request is a request to terminate the operating process of each agent, and the internal information request is a request to output internal information, an access record, etc. of each agent.

Figure 14:
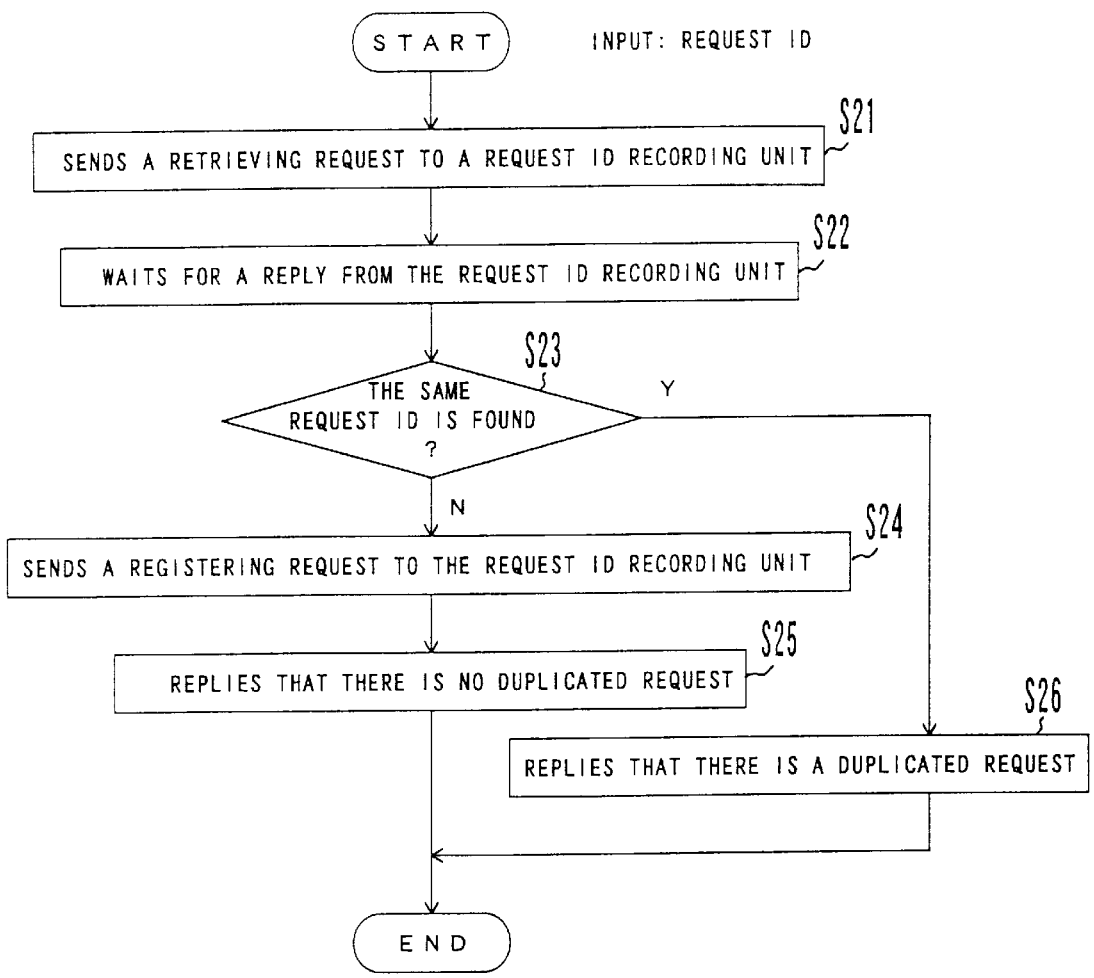
FIG. 14 is a flowchart of a duplicated request check routine.

When the input receiving units 201 and 401 receive an external input in an input waiting state (step 10 in FIG. 13), first, they execute a duplicated request check in step S11 (using a duplicated request check routine shown in FIG. 14). If the request is a duplicated request, the input receiving units execute an ERROR process for eliminating the request (S12 and S13), and the flow proceeds to step S20.

If the request is not a duplicated request, the input receiving units judge whether or not the request is a DB related request (S14). If the request is a DB related request, the input receiving units generate input processing units 202 and 402, and pass the request to the input processing units 202 and 402 as an argument. Then, the flow proceeds to step S20.

If the input request is a terminating request, this agent terminates the process (S16).

If the input request is an internal information request for debugging or operation and management (S17), the agent sends the requested internal information to a requester (S18), and the flow proceeds to step S20. If it is not internal information request, the agent executes an ERROR process judging the request as an error (S19), and the flow proceeds to step S20. In step S20 access records such as the number of processes, error information to be provided as internal information etc. are updated, and then the agent returns to an input waiting state of step S10.

FIG. 14 is a flowchart showing a duplicated request check routine executed in the input receiving unit of each agent. This duplicated request check routine is a sub-routine common to all agents.

Input information to be input to the duplicated request check routine is a request ID, and this request ID is compared with a request ID input to a request ID recording unit. By this comparison, in a duplicated request check routine, it is checked whether or not the same request as the request ID input in the request ID recording unit is recorded, and it is judged whether the request input to the input receiving unit is a new request or the same request as already received.

When a process is started in FIG. 14, first a retrieving request is sent to the request ID recording unit together with the request ID in step S21. Then, in step S22, the agent waits for a reply on whether or not the same request ID as sent from the request ID recording unit is recorded in the request ID recording unit.

In step S23, if as a result of a reply from the request ID recording unit, the same request is found (step S23, Y), in step S26 the routine replies that there is a duplicated request, and terminates the process without sending a registering request to a registering request ID recording unit.

If as a result of a reply from the request ID recording unit, the same request ID is not found (step S23, N), in step S24 the routine sends a registering request to the request ID recording unit. Then, in step S25 the agent replies that there is no duplicated request, and terminates the process.

Figure 15:
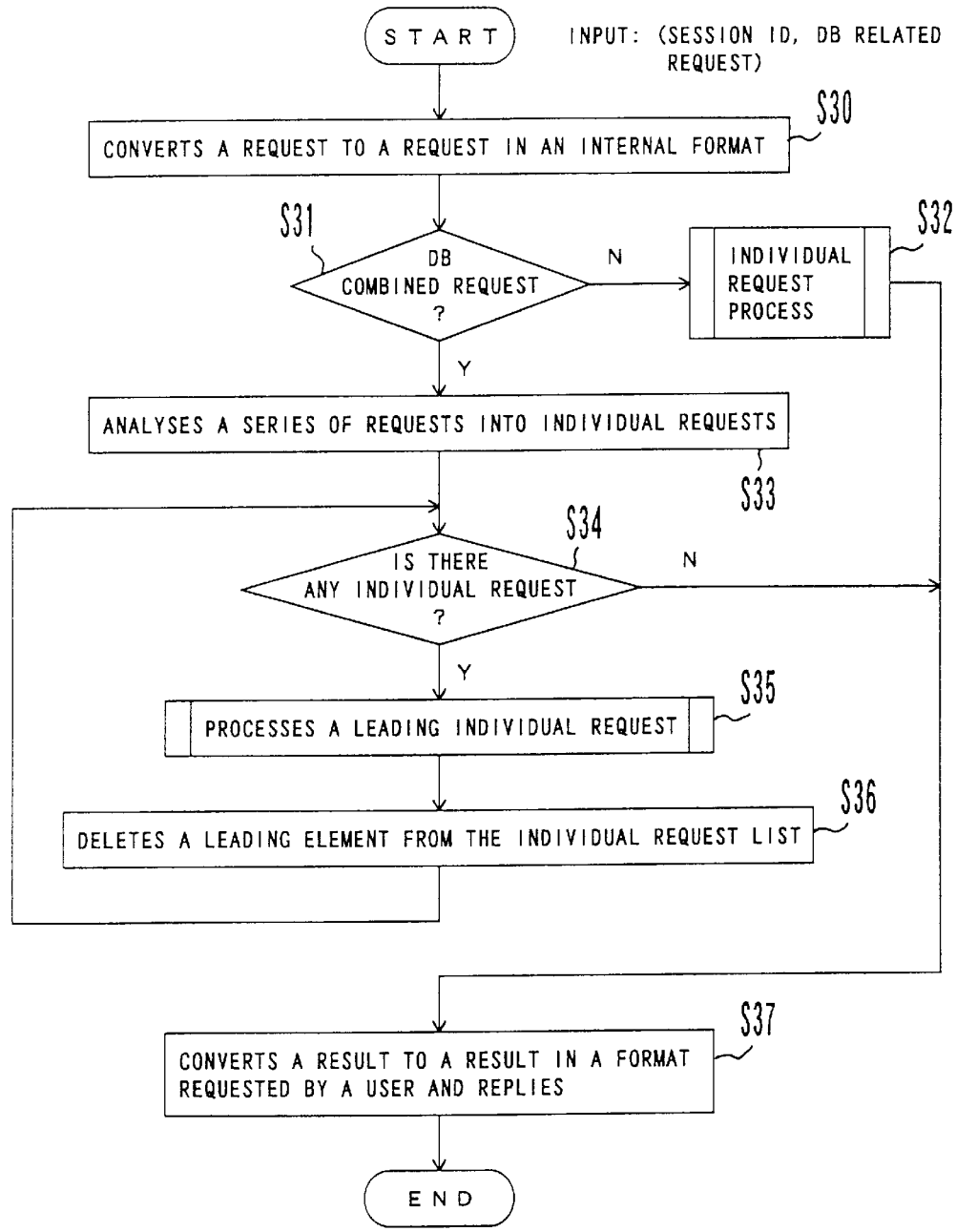
FIG. 15 is a flowchart of an input process unit of a user agent.

FIG. 15 is a flowchart showing the process of an input processing unit 202 of a user agent.

Input information to be input to the input processing unit 202 are a session ID and a DB related request. In step S30, the format of the DB related request is converted to an internal format. In step S31 it is judged whether or not a request is a DB combined request. If the request is not a DB combined request, this process calls up an individual request process routine (FIG. 16) in step S32, and processes an individual DB related request. Then, the flow proceeds to step S37.

If the request is a DB combined request, the flow proceeds to step S33, and the input processing unit 202 analyzes a series of requests into individual requests. Then, all the analyzed individual requests are processed from the top in order (S34 to S36). After all the individual requests are processed, the flow proceeds to step S37.

In step S37 the agent converts the format of the results to a format required by a user, returns the results, and then terminates the process.

Figure 16:
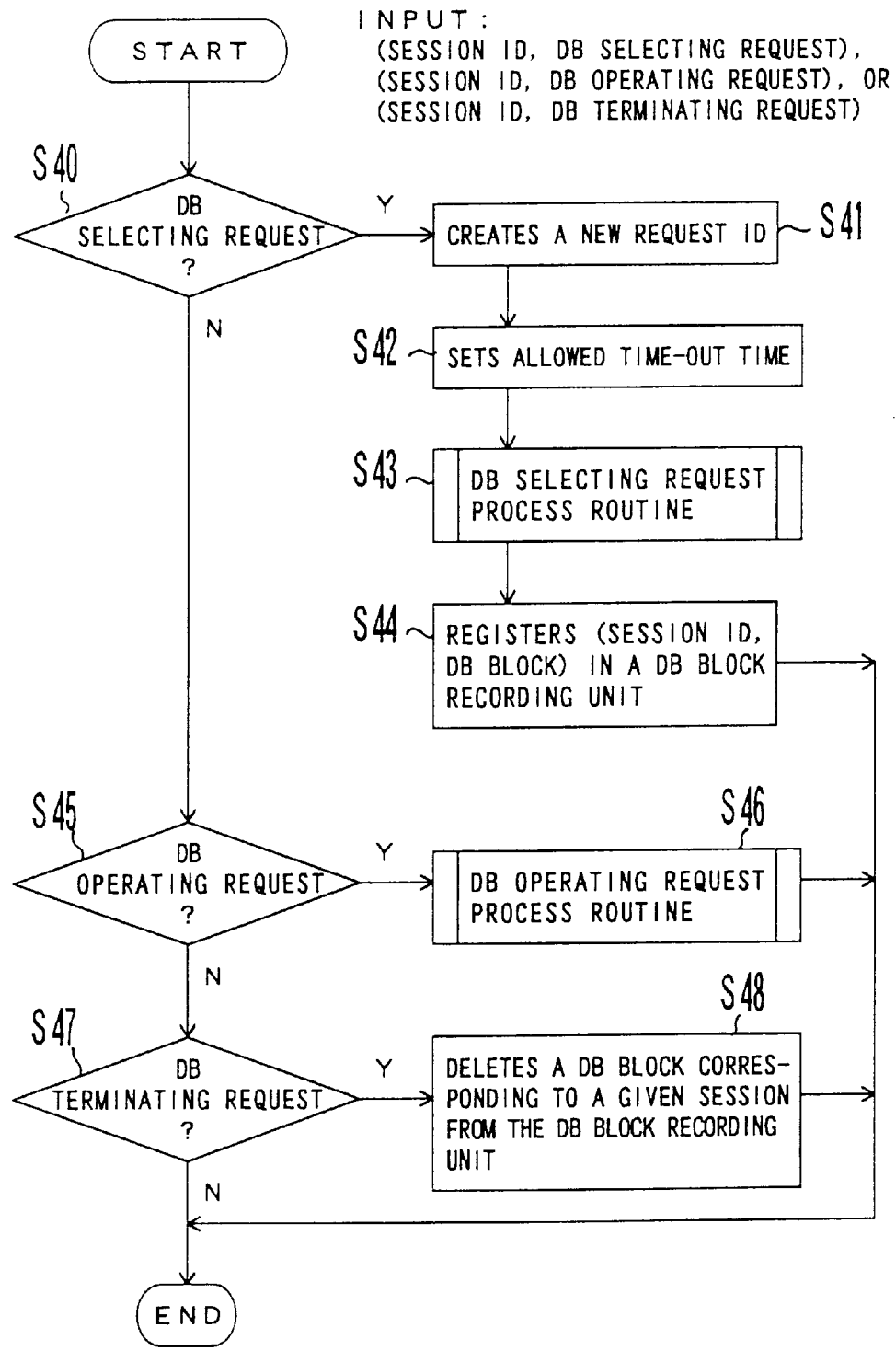
FIG. 16 is a flowchart of an individual request process routine of a user agent.

FIG. 16 is a flowchart showing the process of an individual request process routine of a user agent.

Input information to be input to an individual request process routine is one of information of (a) a session ID and a DB selecting request, (b) a session ID and a DB operating request, and (c) a session ID and a DB terminating request.

First, the agent judges whether or not the request is a DB selecting request (S40). If the request is a DB selecting request, the process calls up a DB selecting request process routine (FIG. 17) after setting a new request ID and allowed time-out time period, distributes a DB selecting request to a facilitation agent and a DB agent according to a condition table, selects a DB block meeting the conditions and records the DB block together with a session ID (S41 to S44).

If the request is a DB operating request (S45), the process calls up a DB operating request process routine (FIG. 19)(S46).

If it is a DB terminating request (S47), the process requests a DB block recording unit 205 to delete a corresponding DB block, using the attached session ID (S48).

FIG. 17 is a flowchart showing the process of a DB selecting request process routine. A DB selecting request process routine is a sub-routine common to all agents.

Input information to be input to the DB selecting request process routine is information of a DB selecting request, a request ID and allowed time-out time period. First, in step S50 the process subtracts the time period needed for the agents process from the allowed time-out time period input. Then, in step S51 the process checks whether or not the allowed time-out time period is 0 or less (S51). If it is 0 or less, the process executes an ERROR process (S52), and terminates the process.

If the allowed time-out time period is not 0 or less, the process acquires a condition table from the condition unit (S53), and prepares a list of output destinations meeting the conditions (S54).

The process sends the request using the list of output destinations. First, in step S55 it is judged whether or not there remains an element of output destinations in the list of output destinations. If there remains an element in the list (step S55, N), then it is judged whether or not the leading element of this list indicates the agent which performs this process (step S56). If the leading element of the list does not indicate this agent (step S56, N), the process sends the request to an output destination indicated by the element (step S58).

If it indicates this agent (step S56, Y), the leading element of the list has a special meaning here, and the agent replies to its own address (step S57). It is only a DB agent that is judged as Y in this step S56, that is, it is in only a DB agent that there is a possibility that the element of the list indicates itself. In this case, the DB agent sends the name of a database managed by itself as a reply to a preceding agent, that is, the agent which has sent the request to the DB agent.

After either step S57 or S58 is processed, the agent deletes the leading element of the list, that is, the element the process of which is completed is deleted from the list (step S59), and then returns to the judgement in step S55, and repeats steps S55 to S59 until all the remaining elements in the list are processed.

After the processes of all the elements in the list are completed (step S55, Y), the flow proceeds to step S60.

Then, in step S60 the process calls up a reply waiting routine (FIG. 18), then collects replies in step S61, and returns a reply to a requester.

Figure 18:
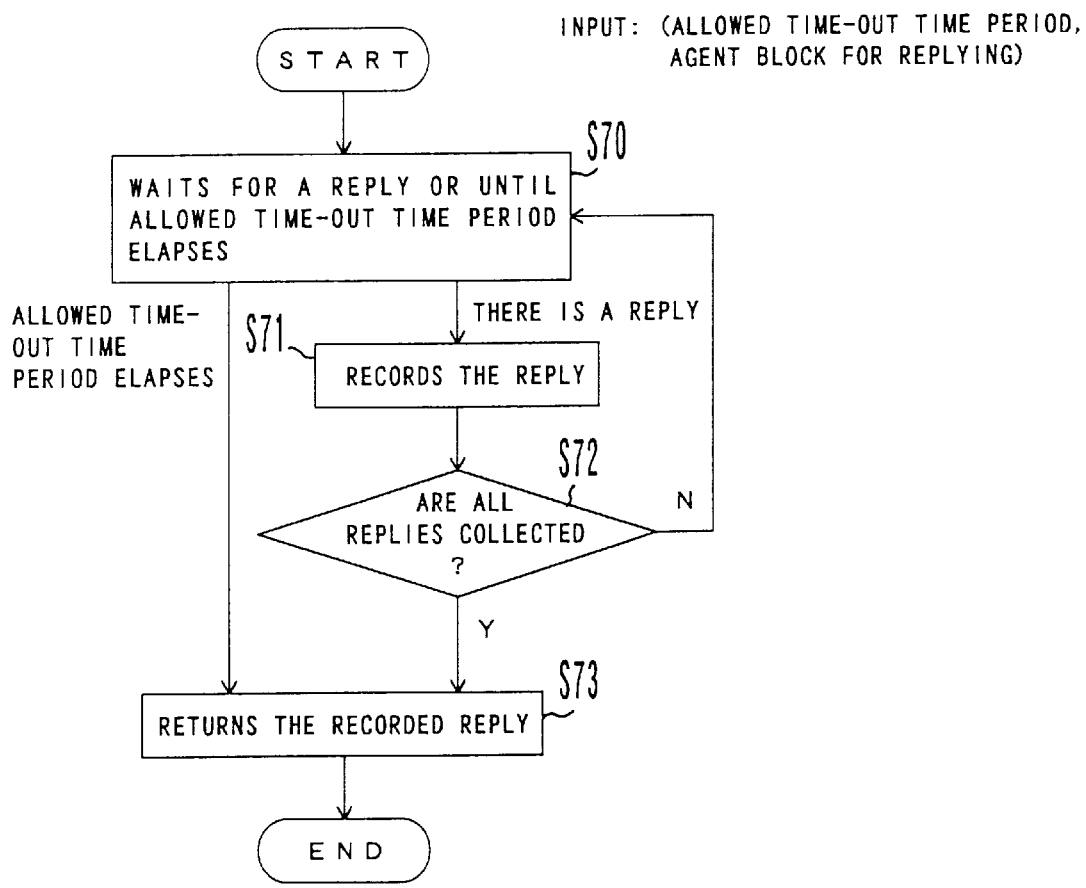
FIG. 18 is a flowchart of reply waiting routine.

FIG. 18 is a flowchart showing the process of a reply waiting routine. The reply waiting routine is a sub-routine common to all agents.

Input information to be input to the reply waiting routine is information of the allowed time-out time period and a replying agent block. The reply waiting routine is a routine in which a time-out process is executed, and it waits for a reply or waits until the allowed time-out time period passes (S70). When all the replies are collected or the allowed time-out time period passes before all the replies are collected, the routine returns the replies collected up to then (S71 to S73) and terminates the process.

FIG. 19 is a flowchart showing the process of a DB operating request process routine of a user agent.

Input information to be input to the DB operating request process routine is information of a session ID and a DB operating request. The DB operating request process routine is a routine in which a DB operating request is actually processed. In step S80 the agent acquires a DB block corresponding to a session ID given from the DB block recording unit 205. Then, in step S81 the input processing unit 202 prepares a new request ID, and consecutively in step S82 it decides the allowed time-out time period.

In step S83 the input processing unit 202 issues a request message obtained from the DB block recording unit 205 (a DB operating request, a request ID, an allowed time-out time period) to all DB agents in the DB block. Then, in step S84 the routine calls up a reply waiting routine in FIG. 18, and in step S85 it collects results, processes, and returns a reply.

Figure 20:
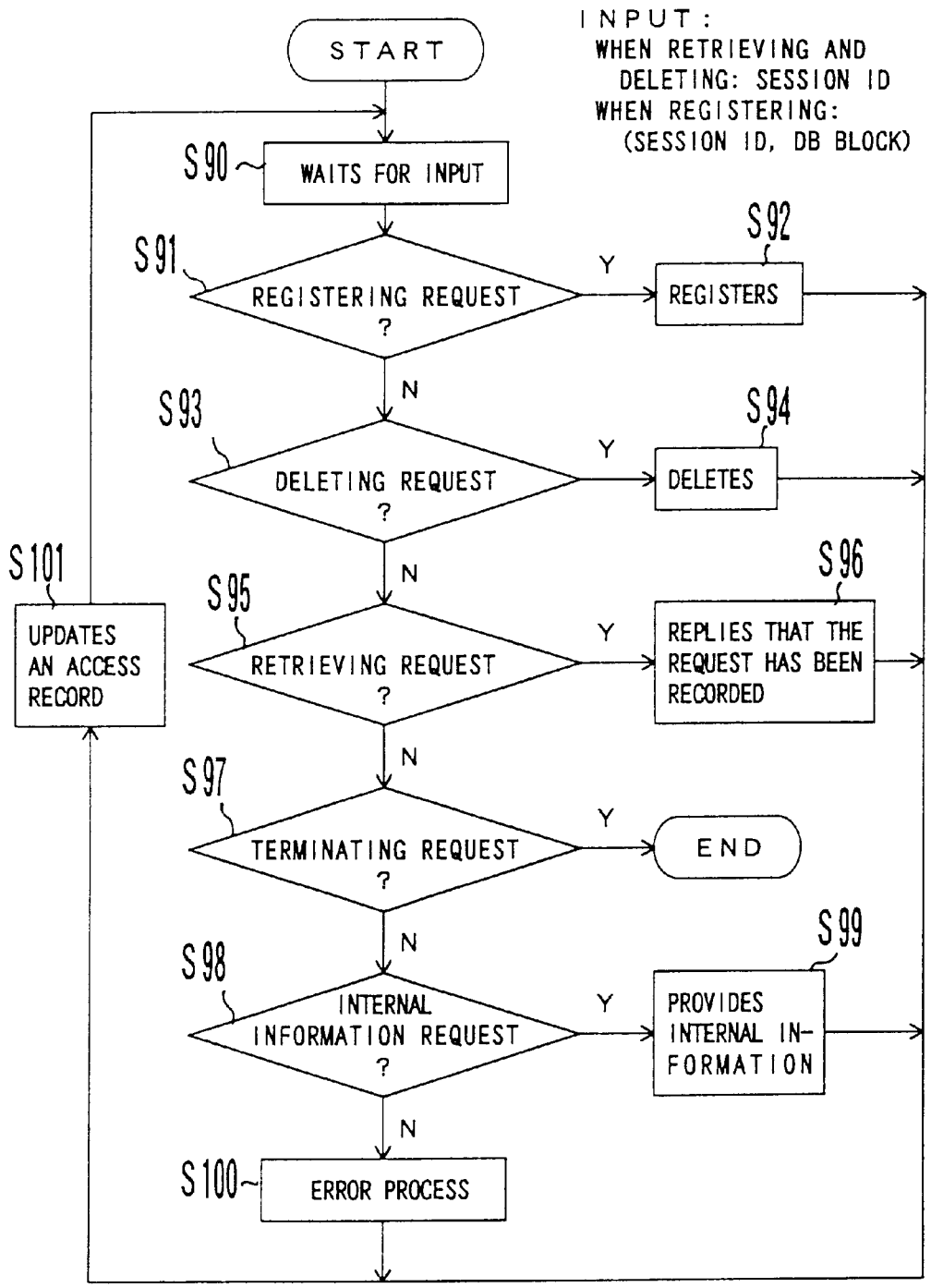
FIG. 20 is a flowchart of a database block recording unit of a user agent.

FIG. 20 is a flowchart showing the process of a DB block recording unit 205 of a user agent.

Input information to be input to the DB block recording unit 205 is information of a session ID when retrieving or deleting, and a session ID and a DB block when registering. The DB recording unit 205 receives request class information which indicates a request class. When there is a request in an input waiting state (S90), the DB block recording unit 205 judges request class. When the request is a registering request, the DB block recording unit 205 performs a registering process of a session ID and a DB block (S91 and S92). When the request is a deleting request, the DB block recording unit 205 performs a deleting process of the entry of the relevant session ID (S93 and S94). When the request is a retrieving request, the DB block recording unit 205 returns the entry of the relevant session ID (S95 and S96). And the DB block recording unit 205 terminates the process for a terminating request (S97). For an internal information request for debugging, operation and management the agent provides requested internal information (S98 and S99). If the request is a request other than all the above-mentioned requests, the agent executes a predetermined ERROR process (S100).

Then, the DB block recording unit 205 updates an access record for requests other than a terminating request (S101), and it returns to an input waiting state (S90).

Figure 21:
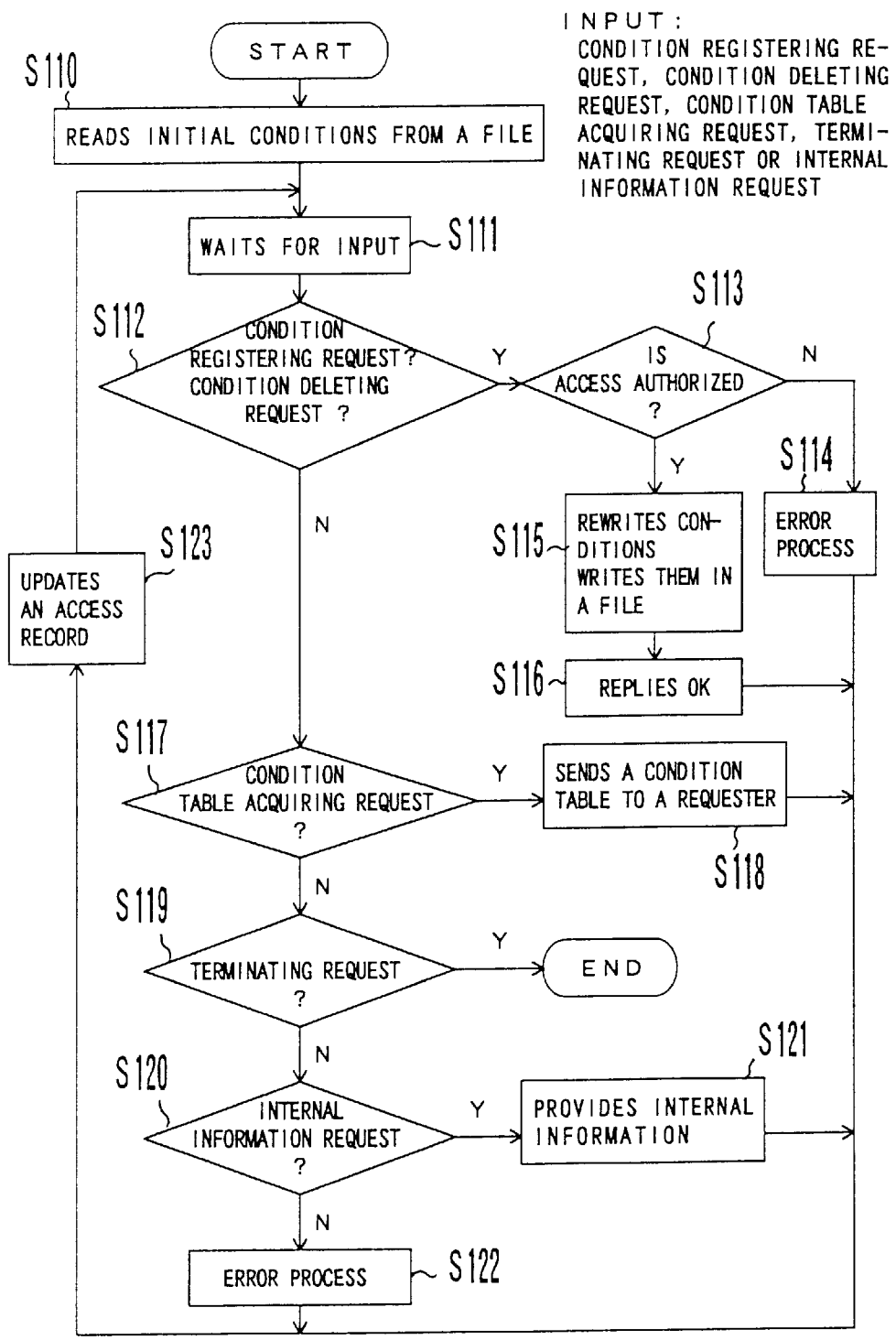
FIG. 21 is a flowchart of a condition unit.

FIG. 21 is a flowchart showing the process of a condition unit. The processing procedure of the condition unit is common to all agents.

Input information to be input to the condition unit is one of information of (a) a condition registering request, (b) a condition deleting request, (c) a condition table acquiring request, (d) a terminating request, or (e) an internal information request.

First, in step S110 the condition unit reads a condition table given as initial conditions from a predetermined file, and in step S111 it enters an input waiting state. When there is any request, the flow proceeds to step S112, and the condition unit judges whether or not the request is a condition registering request or condition deleting request. If the request is the condition registering request or condition deleting request, the agent checks whether or not a requester has the authority to access (S113). If the requester does not have the authority to access, the agent executes an ERROR process (S114). If the requester has the authority to access, the condition unit registers conditions in a condition table or deletes conditions from a condition table as requested, writes a rewritten result in a file, and replies that the condition unit has completed the process (S115 and S116).

When the request is a condition table acquiring request, the condition unit returns the condition table to a requester (S117 and S118).

For the terminating request the condition unit terminates the process (S119).

For the internal information request for debugging, operation and management, the condition unit provides the requested internal information (S120 and S121). If the request is a request other than all the above-mentioned requests, the condition unit executes a predetermined ERROR process (S122).

Then, the condition unit updates an access record for requests other than a terminating request (S123), and it returns to an input waiting state in step S111.

Figure 22:
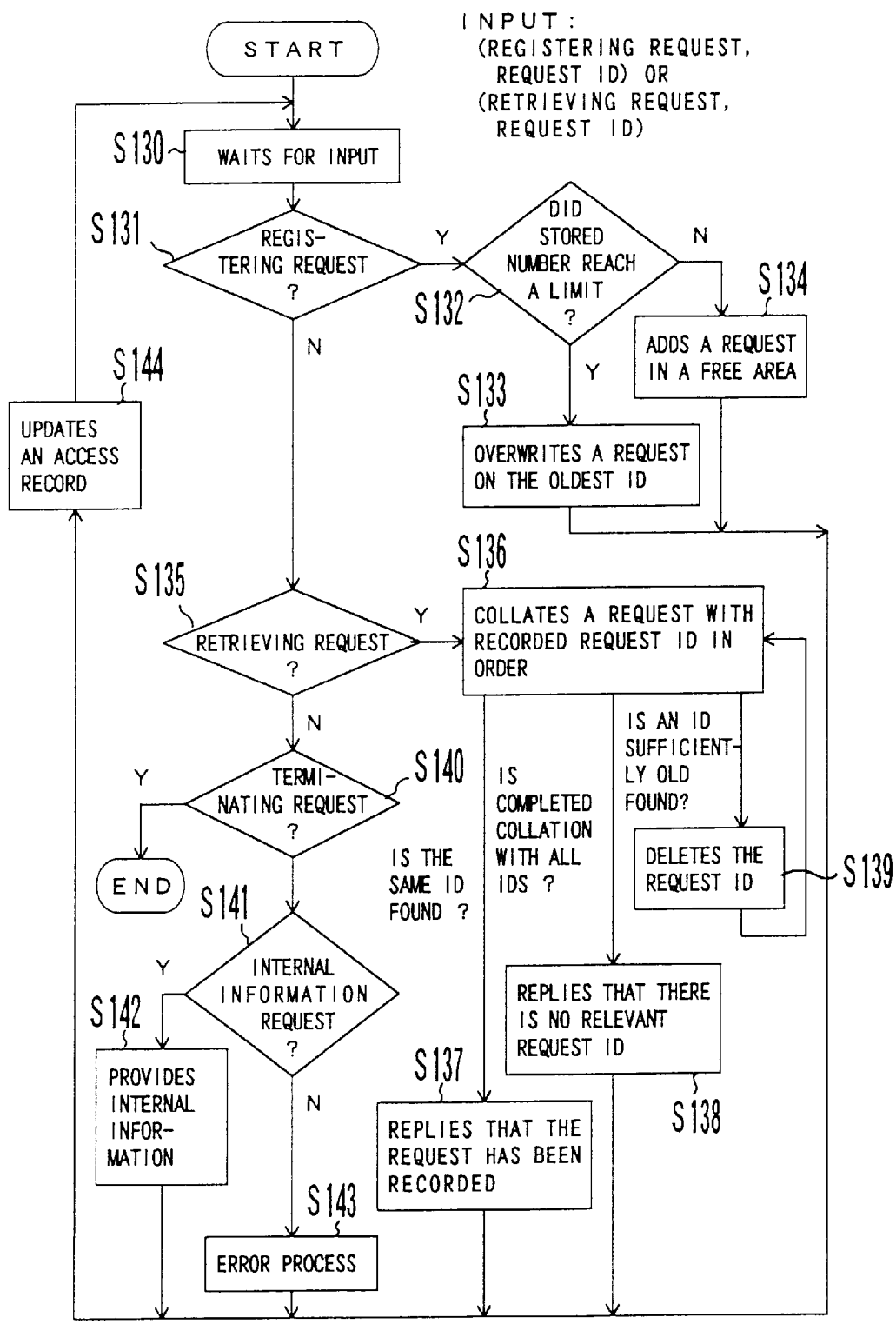
FIG. 22 is a flowchart of a request identification recording unit.

FIG. 22 is a flowchart showing the process of a request ID recording unit. The processing procedure of the request ID recording unit is common to all agents.

Input information to be input to the request ID recording unit is either information of (a) a registering request and a request ID, or (b) a retrieving request and a request ID. When there is any request in an input waiting state in step S130, the agent executes the following processes depending on a request class.

When the request is a registering request (S131), the request ID recording unit overwrites a new request ID on the oldest request ID (S133) or additionally registers a new request ID in a free area (S134) depending on whether or not the storing number of request IDs reaches a limit (S132).

When the request is a retrieving request (S135), the request ID recording unit collates the request with recorded request IDs in order (S136). If the same request ID is found, the request ID recording unit returns the relevant entry (S137). If the same request ID is not found after all IDs are collated, the request ID recording unit replies that there is no relevant request ID (S138). If during this collation a request ID sufficiently older than the allowed time-out time period is found, the request ID recording unit deletes the request ID (S139).

When the request is a terminating request, the request ID recording unit terminates the process (S140).

For the internal information request for debugging, operation and management, the request ID recording unit provides the requested internal information (S141 and S142). If the request is a request other than all the above-mentioned requests, the request ID recording unit executes a predetermined ERROR process (S143).

Then, the request ID recording unit updates an access record for requests other than a terminating request (S144), and it returns to an input waiting state in step S130.

FIG. 23 is a flowchart showing the process of an input receiving unit 301 of a facilitation agent.

The input receiving unit 301 receives as external input information one of information of (a) a DB selecting request, a request ID and an allowed time-out time period, (b) a terminating request, or (c) an internal information request. When the input receiving unit 301 receives a request in an input waiting state (S150), it checks whether or not the request is a duplicated request (S151). If it is a duplicated request, the input receiving unit 301 executes an ERROR process (S152 and S153).

If it is not a duplicated request, the input receiving unit 301 generates an input processing unit 302 for a DB selecting request, and passes the request to the input processing unit 302 as an argument (S154 and S155).

For the terminating request the input receiving unit terminates the process (S156).

For the internal information request for debugging, operation and management, the input receiving unit 301 provides the requested internal information (S157 and S158). If the request is a request other than all the above-mentioned requests, the input receiving unit 301 executes a predetermined ERROR process (S159).

Then, the input receiving unit 301 updates an access record for requests other than a terminating request (S160), and it returns to an input waiting state in step S150.

Figure 24:
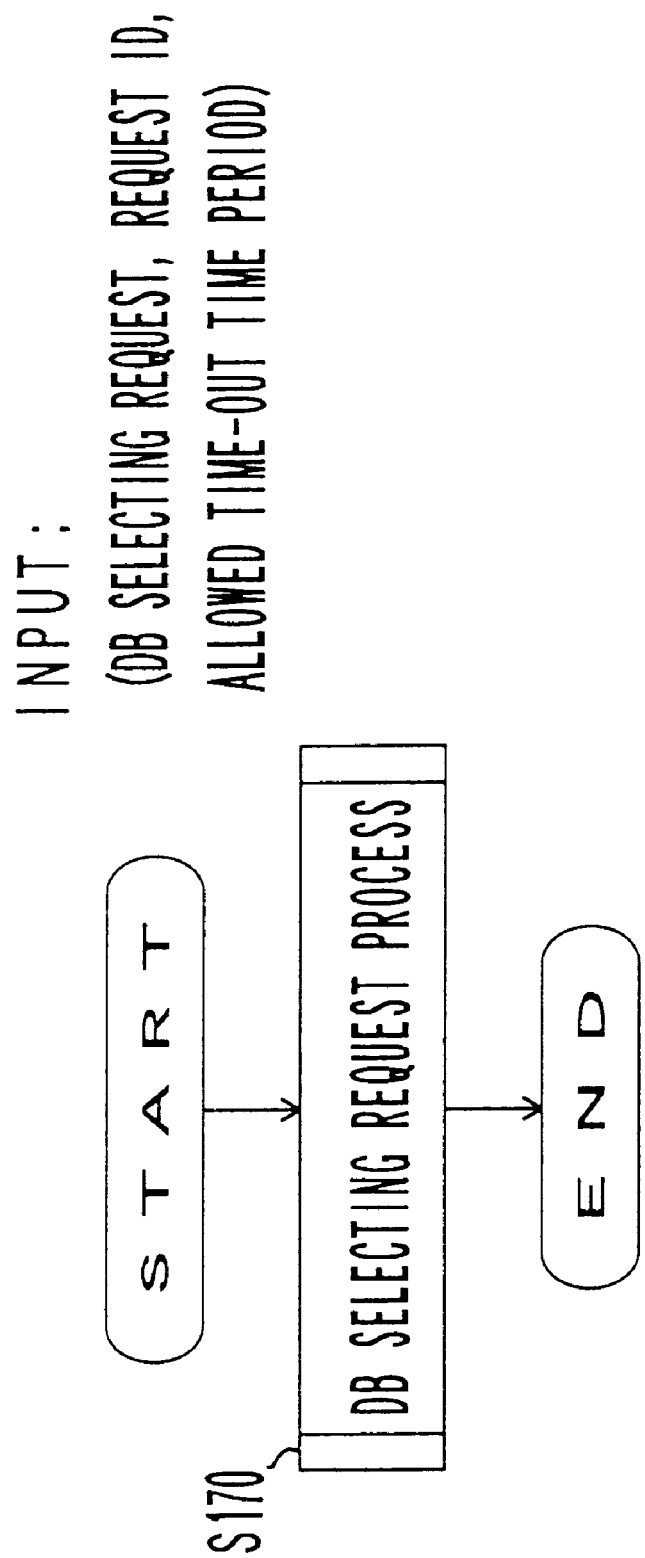
FIG. 24 is a flowchart of an input process unit of a facilitation agent.

FIG. 24 is a flowchart showing the process of an input processing unit 302 of a facilitation agent.

When the input processing unit 302 receives as input information a DB selecting request, the request ID and allowed time-out time period, in step S170 the input processing unit 302 calls up a DB selecting request process routine. In the DB selecting request process routine the process described referring to FIG. 17, is executed.

Figure 25:
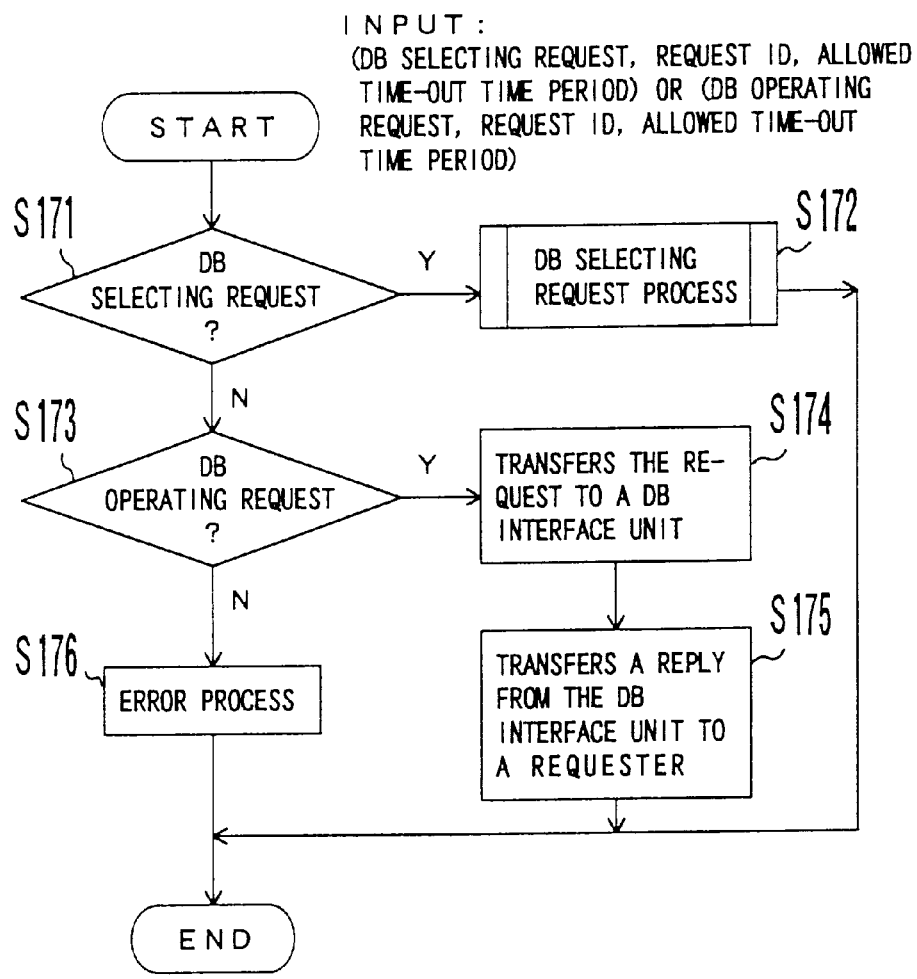
FIG. 25 is a flowchart of an input process unit of a database agent.

FIG. 25 is a flowchart showing the process of an input processing unit 402 of a DB agent.

The input processing unit 402 receives as input information either information of (a) a DB selecting request, the request ID and allowed time-out time period, or (b) a DB operating request, the request ID and allowed time-out time period.

The input processing unit 402 of a DB agent calls up a DB selecting request process routine (FIG. 17) for the DB selecting request (S171 and S172).

For the DB operating request the input processing unit 402 transfers the request to a DB interface unit 405, and transfers a reply from the DB interface unit 405 to a requester (S173 to S175). For requests other than the DB operating request the input processing unit 402 executes a predetermined ERROR process (S176) and terminates the process.

Figure 26:
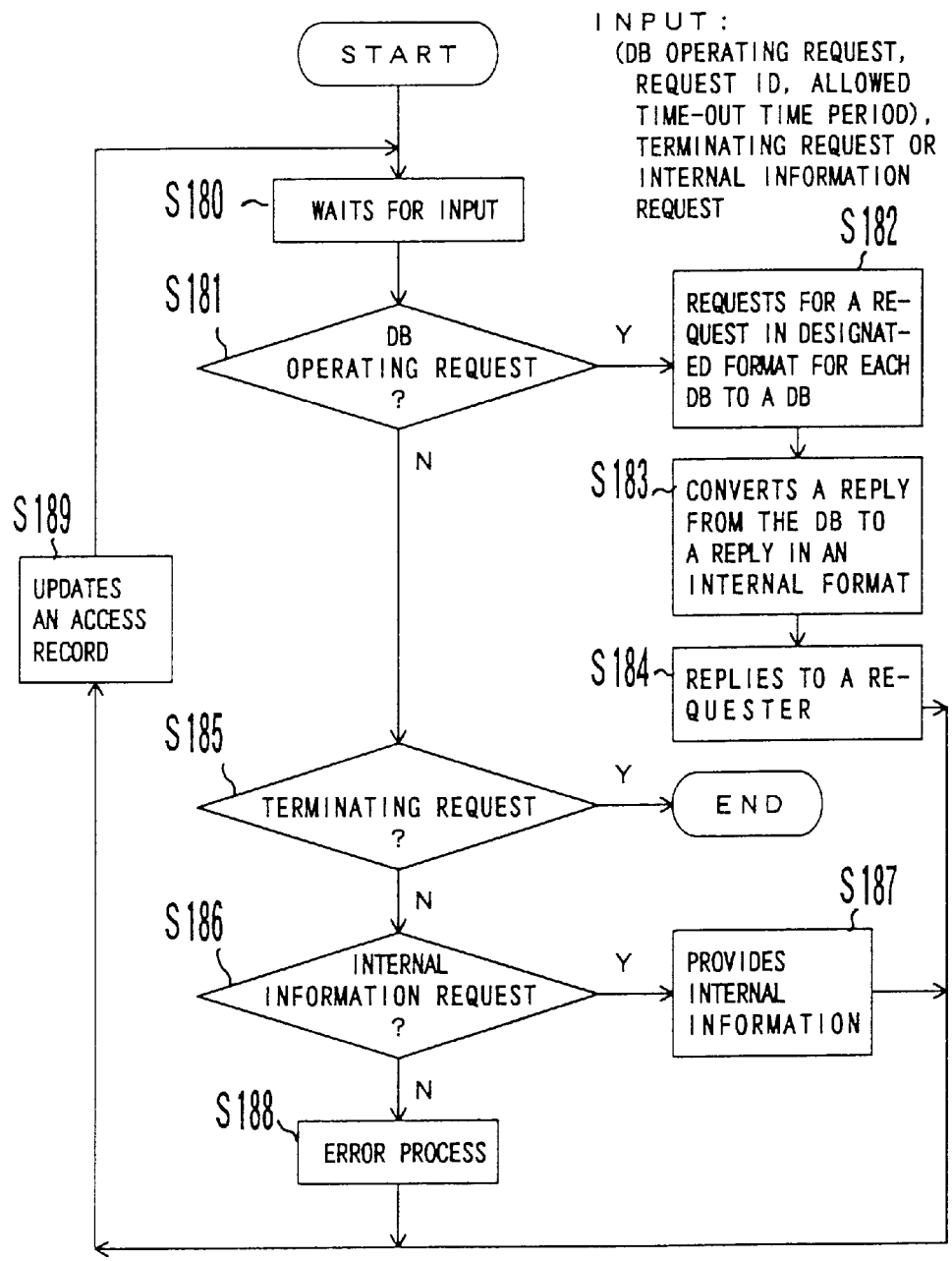
FIG. 26 is a flowchart of a database interface unit of a database agent.

FIG. 26 is a flowchart showing the process of a DB interface unit 405 of a DB agent.

Input information of the DB interface unit 405 is one of information of (a) a DB operating request, the request ID of the DB operating request and allowed time-out time period, (b) a terminating request, or (c) internal information request.

When the DB interface unit 405 receives a DB operating request in an input waiting state in step S180, it requests a database (DB) to reply to the request in a designated format for each database (DB) (S181 and S182). In a designated format means, for example, using an access language decided by a DB class. When the DB interface unit receives a reply from the DB, it converts the format of the reply to an internal format predetermined in advance in this system, and returns the reply to a requester (S183 and S184).

For a terminating request, the DB interface unit 405 terminates the process (S185).

For the internal information request for debugging, operation and management, the DB interface unit 405 provides requested internal information (S186 and S187). If the request is a request other than all the above-mentioned requests, the DB interface unit 405 executes a predetermined ERROR process (S188).

Then, the DB interface unit 405 updates an access record for requests other than a terminating request (S189), and it returns to an input waiting state in step S180.

4. Features and Effect of the Facilitation Mechanism of a Distributed Configuration.

The key points of the above-mentioned facilitation mechanism of a distributed configuration are as follows.

(1) The facilitation mechanism is composed of three kinds of agents, that is, a user agent, a facilitation agent and a DB agent, which are distributed.

(2) The basic operations of the three kinds of agents are the same, and the user agent and DB agent are provided with an extended function in addition to the basic operations.

(3) A load is distributed by operating a plurality of agents in separate computers. A plurality of the agents can also be operated in one computer.

(4) The facilitation mechanism can be operated in parallel by dividing the interior process of each agent into a plurality of processes.

(5) Requests are divided into requests for selecting DBs and requests for selected DBs. The request for selecting DBs and the request for the selected DBs can both be made by one request.

(6) The operation of the facilitation mechanism is divided into the two stages of the selection of individual DB requests, and the requests for selected DBs. When both the selection of an individual DB request and the request for the selected request are issued by one request, the request for the selected DB is sent at the same time when the individual DB is selected.

(7) By communicating through a plurality of facilitation agents using conditions held by a plurality of the facilitation agents, databases are selected.

(8) By an agent setting the allowed time-out time period for replying to a request transferred by another agent, which is made by subtracting the time period needed for the agent's process from the allowed time-out time period given to the agent unnecessary processes which are not executed within the time designated first, are avoided in a distributed configuration.

(9) By assigning an identification number to a request, duplicated request processes are avoided.

(10) By setting the time period for recording the identification numbers of requests to be over the allowed time-out time period given to the agent, unnecessary request IDs are deleted.

(11) All the differences in the various kinds of input/output procedures between the facilitation mechanism and a user are eliminated by a user agent simultaneously.

(12) All the differences in the various kinds of input/output procedures between the facilitation mechanism and databases are eliminated by a user agent simultaneously.

(13) The modification of user's setting information is processed only for a corresponding user agent, and the modification of the setting of the whole system is not necessary.

(14) The modification of database setting information is processed only for a corresponding DB agent, and the modification of the setting of the whole system is not necessary.

(15) Agents can be individually added and the system can be extended without registering the information of new agents and the modification of agents in all agents.

(16) By dividing all the agents into several agent blocks, security protection for each agent block is available. This point is described later.

(17) By limiting specific user information to corresponding user agents and a part of agents, protecting the security of user's information is available.

(18) By limiting specific database information to corresponding DB agents and a part of agents, protecting the security of database's information is available.

The features of the facilitation mechanism configured as above are as follows.

(a) Configuration Independent of Application Field:

All data dependent on an application field is included in a condition table possessed by an agent, and the other data is independent of the application field.

(b) Addition of Agents and Extension of the System can be Easily Done:

No global data needs to be registered in all agents. For this reason agents can be easily added and the system can be easily extended.

(c) Operation can be Expected Within a Certain Time:

Since the operation of each agent is limited to the decision of an output destination by referring to a condition table, and the transfer of an input to the output destination, the operation time of each agent can be easily estimated. Since a duplicated request process such as a loop, etc. is prohibited, it is expected that operation is done within a certain time.

(d) System Configuration in Which Different Models Exist, is Available:

Each agent exchanges information by communicating, and does not share data. For this reason, even when a distributed system is composed of a plurality of computers, and even in such a heterogeneous environment that models of computers operated by an agent are different, the database system can be operated. Since a large scale system cannot often be composed only of a single model of a computer, it is a great advantage that different models of computers can be used.

Next, a concrete embodiment of the present invention is described by referring to FIGS. 27 to 30.

FIG. 30 shows an example of an agent structure comprising three companies C1, C2 and C3.

Figure 27:
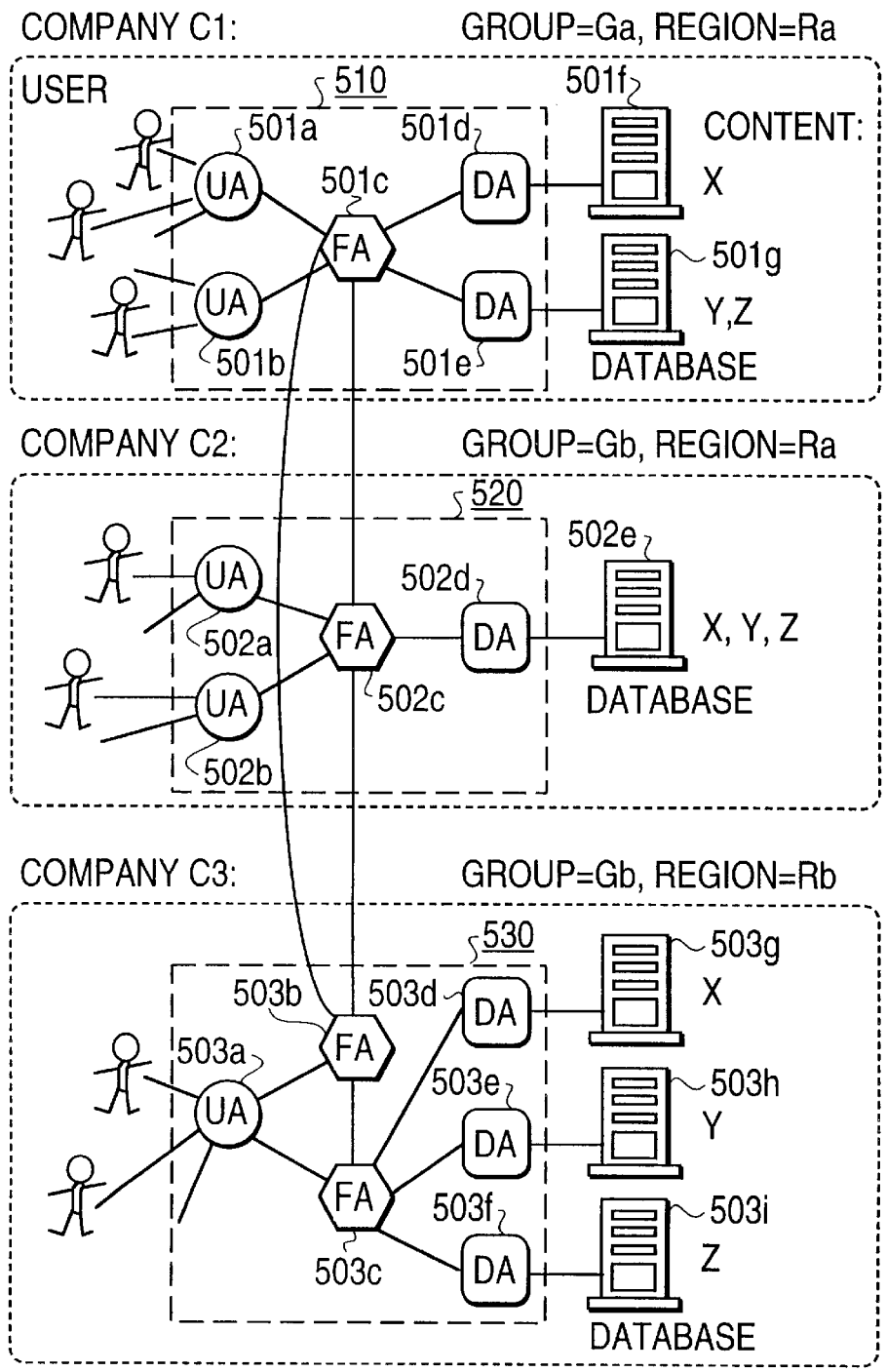
FIG. 27 is an example showing a configuration of an agent of this embodiment.

In FIG. 27 "Company" represents a corporation, and C1, C2 and C3 are names of companies in that corporation. "Group" represents a group of affiliated companies, either Ga corporate group or Gb corporate group in this example. "Region" represents a location of a company, such as the Kanto area, xx prefecture or yy city, either Ra area or Rb area in this example. "Content" represents a product classification handled by a company (one of X, Y and Z), for example, a passenger car, food, etc.

Company C1 belongs to Ga group and is located in Ra.
Company C2 belongs to Gb group and is located in Ra.
Company C3 belongs to Gb group and is located in Rb.

That is, companies C2 and C3 belong to the same corporate group, and companies C1 and C2 are located in the same area.

Agents managed by company C1 are user agents UA501a and UA501b, a facilitation agent FA501c, and DB agents DA501d and DA501e. Databases 501f and 501g of company C1 have a content X and contents Y and Z, respectively.

Agents managed by company C2 are user agents UA502a and UA502b, a facilitation agent FA502c, and DB agents DA502d and DA502e. Database 502e of company C2 has the contents X, Y and Z.

Agents managed by company C3 are a user agent UA503a, facilitation agents FA503b and FA503c, and DB agents DA503d, DA503e and DA503f. Databases 503g, 503h and 503i of company C3 have contents X, Y and Z, respectively.

Although these agents and databases can be technologically implemented by one computer, in fact the following elements are taken into consideration.

(1) It is not desirable from the viewpoint of security protection to implement services between different companies on the same computer.

(2) It is desirable from the viewpoint of load distribution to use a plurality of user agents.

(3) It is anticipated that the load of a facilitation agent is not so heavy.

(4) Since a database is usually a large application, it is desirable to operate one database in one computer.

(5) It is desirable to operate a DB agent near a corresponding database.

If the above-mentioned points are taken into consideration, the computer configuration desirable for implementing the agents shown in FIG. 27 is as follows.

(a) One computer is assigned to each user agent.

(b) One computer is assigned to each database, and a corresponding DB agent is also operated in the same computer.

(c) A facilitation agent is independently assigned to a computer, or it is operated in a computer where a user agent operates or in a computer where a DB agent operates.

When a large scale system as shown in FIG. 27 is configured, it is necessary to divide agents in the system into a plurality of management units from the viewpoint of system operation and management. This management unit of an agent is called an agent block. The agent block is set, for example, in units of companies for ease of use and operability. In FIG. 27 an agent in a computer operated by company C1, an agent in a computer operated by company C2, and an agent in a computer operated by company C3 are set as an agent block 510, an agent block 520 and an agent block 530, respectively.

Companies C1, C2 and C3 manage an agent block operated by itself, by which the security of each agent block can be protected.

FIGS. 28 to 30 show examples of a condition table possessed by each agent in each of the companies C1, C2 and C3. "*" in conditions means to distribute a request to a corresponding output destination under any condition (or value). The fact that an output destination is itself in a condition table of a DB agent means to access a certain database under its own control.

A user agent UA501a of company C1 has a condition table as shown in FIG. 28A. The user agent UA501a transfers a request to a facilitation agent FA501c. The same also applies to the condition table of the user agent UA501b (FIG. 28B).

A facilitation agent FA501c of company C1 has a condition table as shown in FIG. 28C. If one of company C1, group Ga, area Ra, or product classification X is designated by a request, a DB agent DA501d is selected as the output destination of the request. If one of company C1, group Ga, area Ra, or the product classification Y to Z is designated by a request, a DB agent DA50le is selected as the output destination of the request.

If one of company C2, group Gb or area Ra is designated by a request, a facilitation agent FA502c of company C2 is selected as the output destination of the request. If one of company C3, group Gb or area Rb is designated by a request, a facilitation agent FA503b of company C3 is selected as the output destination of the request.

A DB agent DA501d of company C1 has a condition table as shown in FIG. 28D. Since this table shows the output destination of the DB agent DA501d is the DB agent DA501d itself for any conditions designated by a request, the DB agent DA501d executes a process the target of which is a database 501f, and returns the results to a requester. The same also applies to the condition table of DB agent DA501e of company C1 (FIG. 28E).

A user agent UA502a of company C2 has a condition table as shown in FIG. 29A. The user agent UA502a transfers the request to a facilitation agent FA502c for any conditions designated by a request. The same also applies to the condition table of a user agent UA502b of company C2 (FIG. 29B).

A facilitation agent FA502c of company C2 has a condition table as shown in FIG. 29C. If one of company C1, group Ga or area Ra is designated by a request, the facilitation agent FA501c is selected as the output destination of the request. If one of company C2, group Gb or area Ra is designated by a request, a DB agent DA502d of its own company C2 is selected as the output destination of the request. If one of company C3, group Gb or area Rb is designated by a request, a facilitation agent FA503b of company C3 is selected as the output destination of the request.

A DB agent DA502d of company C2 has a condition table as shown in FIG. 29D. Since this table shows the output destination of the DB agent DA502d is the DB agent DA502d itself for any conditions designated by a request, the DB agent DA502d executes a process the target of which is database 502e, and returns the results to a requester.

A user agent UA503a of company C3 has a condition table as shown in FIG. 30A. If either company C3 is not designated by a request, or area Ra is designated by a request, the user agent UA503a transfers the request to a facilitation agent FA503b. If one of company C3, group Gb or area Rb is designated by a request, the user agent UA503a transfers the request to a facilitation agent FA503c.

A facilitation agent FA503b of company C3 has a condition table as shown in FIG. 30B. If one of company C1, group Ga or area Ra is designated by a request, a facilitation agent FA501c is selected as the output destination of the request. If one of company C2, group Gb or area Ra is designated by a request, a facilitation agent FA502c is selected as the output destination of the request. If one of company C3, group Gb or area Rb is designated by a request, a facilitation agent FA503c of company C3 is selected as the output destination of the request.

A facilitation agent FA503c of company C3 has a condition table as shown in FIG. 30C. The facilitation agent FA503c selects DB agents DA503d, DA503e and DA503f as the output destination of the request depending on the requested product classifications X, Y and Z.

The DB agents DA503d, DA503e and DA503f of company C3 have condition tables as shown in FIG. 30D, FIG. 30E and FIG. 30F, respectively. Since their output destination are the DB agents themselves for any conditions designated by a request, the DB agents DA503*d*, DA503*e* and DA503*f* execute a process the targets of which are database 503*g*, 503*h* and 503*i*, respectively, and returns the results to a requester.

Next, assuming cases where a company located in a specific area is targeted such as (1) a case where a company name is directly designated, (2) a case where only a corporate group is targeted such as a case where brand of a company has priority, and (3) a case where products are purchased from a nearby company, examples of a request distribution in each of the above-mentioned cases are described in order.

(1) An Example of a Request Distribution in a Case Where a Company Name is Directly Designated:

For example, it is assumed that a user connected with a user agent UA501*a* issues a DB selecting request of "company=C1 and content=X".

First, this request is distributed to a facilitation agent FA501*c* according to a condition table shown in FIG. 28A, and then is distributed to a DB agent DA501*d* according to a condition table shown in FIG. 28C. As a result, a database 501*f* is selected.

(2) An Example of Request Distribution in a Case Where Only a Corporate Group is Targeted:

For example, it is assumed that a user connected with a user agent UA502*a* issues a DB selecting request of "group= Gb and content=Y".

First, this request is distributed to a facilitation agent FA502*c* according to a condition table shown in FIG. 29A, and then is distributed to a DB agent DA502*d* and a facilitation agent FA503*b* of company C3 according to a condition table shown in FIG. 29C. This request is also distributed from the facilitation agent FA503*b* to the facilitation agent FA502*c* and a facilitation agent FA503*c* according to a condition table shown in FIG. 29B. Out of these requests the request distributed to the facilitation agent FA502*c* is eliminated by a duplicated request check.

Further, the request is distributed from the facilitation agent FA503*c* to a DB agent DA503*e* according to a condition table shown in FIG. 30C. As a result, a database 502*e* of company C2 and a database 503*h* of company C3 are selected.

(3) An Example of Request Distribution in a Case Where a Certain Company Located in a Specific Area is Targeted:

For example, it is assumed that a user connected with a user agent UA503*a* issues a DB selecting request of "region=Ra and content=Z".

First, this request is distributed to a facilitation agent FA503*b* according to a condition table shown in FIG. 30A, and then is distributed to a facilitation agent FA501*c* and a facilitation agent FA502*c* according to a condition table shown in FIG. 30B. Further, the request is distributed from the facilitation agent FA501*c* and a facilitation agent FA502*c* to a DB agent DA501*e* and a DB agent DA502*d*, respectively, according to a condition table shown in FIG. 28C and 29C. As a result, a database 501*g* of company C1 and a database 502*e* of company C2 are selected.

As described above, the relevant database is automatically selected by conditions designated in the request. As conditions in a condition table, for example, conditions such as user's identification information, information of a password and distributing destination can also be registered. Security protection by means of various kinds of conditions between companies can also be implemented.

Although so far the case where the facilitation mechanism is composed of three kinds of agents, that is, a user agent, a facilitation agent and a DB agent has been described, the present invention is not limited to this case.

For example, when all databases in the system have the same interface, and there is no need for eliminating the differences in databases depending on an agent, the facilitation mechanism can also be composed of only user agents and facilitation agents. The facilitation mechanism can also be composed of only user agents and DB agents without facilitation agents depending on the size of a system. Further, in a database system where the selection of databases and the processing of a request for selected databases are not executed separately, and the selection of databases and the request for selected databases are always executed by one request simultaneously, the facilitation mechanism can also be composed of only facilitation agents and DB agents without user agents.

FIG. 31 is an example showing a configuration of each of the computers shown in FIGS. 4 and 5 which compose the database system of this embodiment.

As shown in FIG. 31, the computer 600 comprises a central processing unit (CPU) 601, a main storage device 602, a hard disk device 603, an input/output device (I/O) 604 such as a display, keyboard, etc., a network connecting device 605 such as a modem, etc., and a medium reading device 606 for reading stored contents from a portable storing medium such as a disk, a magnetic tape, etc. All the above units which are connected with each other by a bus 608.

A computer as shown in FIG. 31 reads a program or data stored in a storing medium 607 such as a magnetic tape, a floppy disk, a CD-ROM, MO, etc. using the medium reading device 606, and down-loads them to the main storage device 602 and/or the hard disk 603. The processing of this embodiment can be implemented by means of software, by the CPU 601 executing this program or data.

As described above, by adopting the present invention the following effects can be obtained compared with the conventional facilitation mechanism of a concentrated configuration.

(1) Load at the Time of Operation can be Distributed

When it is so configured that individual agents may be operated in different computers, a prompt reply with a short waiting time can be expected from the user's point of view, since the load of the facilitation work can be distributed.

(2) Scalable Configuration in Which the Cost of Operation and Management can be Distributed, can be Realized.

Since even in an operation form where a user and a database are registered, it is a specific user agent and DB agent that have to be registered, and there is no need for design modification of the whole system, etc. Even modification, deletion and addition of the input/output format can be coped with only by modification, deletion and addition of a specific user agent and DB agent. In this case, there is also no need for design modification of the whole system, etc. Accordingly, a scalable configuration where an increase in the number of users and databases can be easily coped with, can be realized.

(3) Security of Information can be Protected

In this mechanism, since information is not configured so as to be concentrated in one place and managed, information does not leak externally and the security of information can be protected, if agent blocks are divided in units in which the security of information is needed.

What is claimed is:

1. A database system performing mediation between users and a plurality of databases, comprising:

facilitation means for mediating between users and databases, including a plurality of user agents, each of said user agents corresponding to at least one of the users and including means for receiving a request for a requested database from the one of the users, and means for outputting a result of the request to the one of the users;

a plurality of database agents, each of said database agents having a corresponding database and including means for receiving the request sent from a requesting agent, means for performing an access of the corresponding database according to the request, and means for returning a result of the access to the requesting agent; and a plurality of facilitation agents, each of said facilitation agents provided separately and independently of said user agents and said database agents, a subset of said facilitation agents being connected at multiple stages between at least one of said user agents and at least one of said database agents, and each of said facilitation agents including means for receiving the request sent from a first agent, means for selecting a second agent to which the request should be sent, and means for sending the request to the second agent.

2. The database system according to claim 1, wherein a plurality of said agents composing said facilitation means are arranged in a plurality of computers.

3. The database system according to claim 1, wherein said users, said facilitation means and a plurality of said databases are arranged in a same computer.

4. The database system according to claim 1, wherein the interior of said agent is divided into processes operable in parallel for each processing.

5. The database system according to claim 1, wherein when one of said user agents receives the request for the requested database from the one of the users, said facilitation means performs a first-stage process for selecting the requested database from among the plurality of databases according to the request, and a second-stage process for processing an operation based on the request, the first-stage process, including outputting, from the one of said user agents to one of said database agents corresponding to the requested database via at least two of said facilitation agents connected at multiple stages; a selection request to select the requested database from among the databases according to the request, and subsequently outputting, from the one of said database agents via the at least two of said facilitation agents to the one of the user agents, a selection result corresponding to the selection request, and the second-stage process including sending an operation request from the one of said user agents to the one of said database agents corresponding to the requested database; accessing the requested database in accordance with the operation request; and subsequently sending an access result from the one of said database agents to the one of said user agents, and further from the one of said user agents to the one of the users.

6. The database system according to claim 1, wherein said user agent sorts user's requests into a request for selecting a database and a request for a selected database, said request for selecting a database is sent to said agent decided according to the request, and said request for the selected database is sent to said database agent for accessing the selected database.

7. The database system according to claim 1, wherein databases are selected by conveying said request for a database to a plurality of the agents according to conditions held by each of said agents.

8. The database system according to claim 1, wherein said agent further comprises means for making an allowed time-out time period for a reply from a next agent to which said agent has sent the request, by subtracting a time period needed itself for a process for the request from the allowed time-out time period given to itself, and executing a time-out process.

9. The database system according to claim 1, wherein said user agent further comprises means for attaching an identification number for exclusively identifying each request, to user's requests, and said facilitation agent and said database agents further comprise means for avoiding a duplicated processing of the same two requests conveyed through different routes by checking said identification numbers.

10. The database system according to claim 9, wherein said agent further comprises means for storing said identification numbers of received requests, and means for eliminating identification numbers when a certain time period elapses after they are stored.

11. The database system according to claim 1, wherein said user agent further comprises means for converting the request to data in a predetermined internal format, and eliminates differences in input/output procedures between the user and the database system.

12. The database system according to claim 1, wherein said database agent further comprises means for converting the format of the received request to the format required by its own corresponding database, means for converting a result of an access to the database to data in a format of said facilitation means, and eliminates differences in input/output procedures between each database and the database system.

13. The database system according to claim 1, wherein the modification of setting information of a user is carried out only for said user agent corresponding to the user carrying out the modification, and the setting modification of said entire facilitation means is not to be required.

14. The database system according to claim 1, wherein the modification of setting information of a database is carried out only for said database agent corresponding to the database carrying out the modification, and the setting modification of said entire facilitation means is not to be required.

15. The database system according to claim 1, wherein all agents in said facilitation means are divided into a plurality of agent blocks, and management is carried out for each of the agent block.

16. The database system according to claim 15, wherein a specific user information is limited to said user agent corresponding to the information and one of a part of said agent blocks, and is stored.

17. The database system according to claim 15, wherein a specific database information is limited to said database agents corresponding to the information and one of a part of said agent blocks, and is stored.

18. The database system according to claim 1, wherein said user agent comprises:

input receiving means for receiving an input from the user;

conditioning means for managing a condition for deciding an output destination of the input according to said input;

request ID recording means for recording an identification number attached to said input;

database block recording means for recording at least one of said selected databases; and input processing means generated every time said input receiving means receives the input, for communicating with said user and said output destination using said conditioning means, said request ID recording means and said database block recording means, and for processing said input.

19. The database system according to claim 1, wherein said facilitation agent comprises:

input receiving means for receiving an input from another agent;

conditioning means for managing a condition for deciding an output destination according to said input;

request ID recording means for recording an identification number attached to the input; and input processing means generated every time said input receiving means receives the input, for communicating with said another agent using said conditioning means and said request ID recording means and for processing said input.

20. The database system according to claim 1, wherein said database agent comprises:

input receiving means for receiving an input from another agent;

conditioning means for managing conditions for deciding one of an output destination and an access destination according to the input;

request ID recording means for recording an identification number attached to the input;

DB interfacing means for accessing corresponding to the database; and input processing means generated every time said input receiving means receives the input, for communicating with said another agent using said conditioning means, said request ID recording means and said DB interfacing means, and for processing said input.

21. A database system performing mediation between users and a plurality of databases, comprising:

facilitation means for mediating between users and databases, including a plurality of agents including plurality of facilitation agents, each agent being one of a user agent, a facilitation agent and a database agent and including means for making an allowed time-out time period for a reply from a next agent to which the request has been sent, by subtracting a time period needed for a process for the request from the allowed time-out time period given to itself, and executing a time-out process, each user agent corresponding to at least one of the users and including means for receiving a request for a requested database from the one of the users, and means for outputting result of the request to the one of the users;

each database agent having a corresponding database and including means for receiving the request sent from a requesting agent, means for performing an access of the corresponding database according to the request, and means for returning a result of the access to the requesting agent; and each facilitation agent including means for receiving the request sent from a first agent, means for selecting a second agent to which the request should be sent, and means for sending the request to the second agent.

* * * * *